United States Patent [19]

Ballard

[11] Patent Number: 5,381,521
[45] Date of Patent: Jan. 10, 1995

[54] SYSTEM AND METHOD OF RENDERING CURVES

[75] Inventor: Dean D. Ballard, Seattle, Wash.

[73] Assignee: Microsoft Corporation, Redmond, Wash.

[21] Appl. No.: 62,383

[22] Filed: May 14, 1993

[51] Int. Cl.$^6$ ............................................. G06F 15/62
[52] U.S. Cl. ................................................... 395/142
[58] Field of Search ............... 395/141, 142, 143, 155, 395/161; 345/134, 135, 136

[56] References Cited

U.S. PATENT DOCUMENTS

| | | | |
|---|---|---|---|
| 4,949,281 | 8/1990 | Hillenbrand et al. | 395/142 |
| 5,313,573 | 5/1994 | Takahama | 395/150 |

*Primary Examiner*—Phu K. Nguyen
*Attorney, Agent, or Firm*—Seed and Berry

[57] ABSTRACT

A system and method of rendering a curve using data look-up tables for rasterizing the curve. The curve is subdivided so that it is approximated by a series of straight line segments of approximately equal length, with no line segment exceeds two pixels in length. The system subdivides any line segment that crosses horizontal axis of two adjacent horizontal scan rows. If the line segment does not cross the horizontal axis of a scan row, the pixel does not require detailed analysis. If the line segment does cross the horizontal axis of a particular horizontal scan row, the system uses look-up tables to determine the distance from the center point of the pixel in which the line segment crosses the horizontal axis to the point at which the line segment crosses the horizontal axis. The system uses three indices as pointers to the data look-up table containing the desired data. The three indices are themselves pointers to separate index tables in which the multiplication calculations required for the data look-up table have been precalculated and are incorporated into the values stored in the index tables. The index tables also incorporate a reduction in resolution from 1/64 to ⅛ pixel resolution. The index tables are also nonlinear to allow more data entries in areas where the round off error resulting from the resolution reduction are greatest. If the line segment crosses the horizontal axis to the left of the center of a pixel, the logic state for the pixel is changed. The system can be implemented on any computer and operates with any raster scan graphics display unit.

30 Claims, 13 Drawing Sheets 0, 0, 0, 0, 0, 0,
289, 289, 289, 289, 289, 289,
578, 578, 578, 578, 578, 578, 578,
867, 867, 867, 867, 867, 867, 867,
1156, 1156, 1156, 1156, 1156, 1156, 1156,
1445, 1445, 1445, 1445, 1445, 1445, 1445, 1445,
1734, 1734, 1734, 1734, 1734, 1734, 1734, 1734,
2023, 2023, 2023, 2023, 2023, 2023, 2023, 2023,
2312, 2312, 2312, 2312, 2312, 2312, 2312, 2312,
2601, 2601, 2601, 2601, 2601, 2601, 2601, 2601,
2890, 2890, 2890, 2890, 2890, 2890, 2890, 2890,
3179, 3179, 3179, 3179, 3179, 3179, 3179, 3179,
3468, 3468, 3468, 3468, 3468, 3468, 3468, 3468,
3757, 3757, 3757, 3757, 3757, 3757, 3757, 3757, 3757,
4046, 4046, 4046, 4046, 4046, 4046, 4046, 4046, 4046,
4335, 4335, 4335, 4335, 4335, 4335, 4335, 4335, 4335,
4624, 4624, 4624, 4624, 4624, 4624, 4624, 4624, 4624,
4913, 4913, 4913, 4913, 4913, 4913, 4913, 4913, 4913,
5202, 5202, 5202, 5202, 5202, 5202, 5202, 5202, 5202,
5491, 5491, 5491, 5491, 5491, 5491, 5491, 5491, 5491,
5780, 5780, 5780, 5780, 5780, 5780, 5780, 5780,
6069, 6069, 6069, 6069, 6069, 6069, 6069, 6069,
6358, 6358, 6358, 6358, 6358, 6358, 6358, 6358,
6647, 6647, 6647, 6647, 6647, 6647, 6647, 6647,
6936, 6936, 6936, 6936, 6936, 6936, 6936, 6936,
7225, 7225, 7225, 7225, 7225, 7225, 7225, 7225,
7514, 7514, 7514, 7514, 7514, 7514, 7514, 7514,
7803, 7803, 7803, 7803, 7803, 7803, 7803, 7803,
8092, 8092, 8092, 8092, 8092, 8092, 8092,
8381, 8381, 8381, 8381, 8381, 8381, 8381,
8670, 8670, 8670, 8670, 8670, 8670, 8670,
8959, 8959, 8959, 8959, 8959, 8959, 9248, 9248, 9248, 9248, 9248, 9248,

SYSTEM AND METHOD OF RENDERING CURVES

TECHNICAL FIELD

The present invention relates generally to a system and method for rendering curves and, more particularly, to a system and method of rasterizing curves.

BACKGROUND OF THE INVENTION

Computer systems frequently include graphics displays such as a display screen or graphic printer capable of displaying curves and alphanumeric characters. FIG. 1 illustrates a curve 2 and a series of alphanumeric characters 3 in the form of a graph that may be displayed on a typical computer display screen or graphic printer.

Graphic images are shown on the display screen or printer as a series of small dots. A pixel represents the smallest element or dot on the display screen or printer that can be addressed. The display screen or printed page is made up of many scan lines arranged in one dimension, typically the horizontal dimension, with each scan line being one pixel high. Each horizontal scan line is comprised of a series of pixels. As an example, a typical laser printer may have a resolution of 300 dots per inch. This means that the printed page is made up of 300 horizontal scan lines per inch, and each horizontal scan line is made up of 300 pixels per inch. A curve or alphanumeric character is displayed by the display screen or the printer using a group of pixels that approximates the curve and character.

A graphics display computer system generally includes a memory for storing a digital representation of the curve or character to be displayed. In prior art computer system, the digital values represent each pixel on the display screen or printed page. This approach to graphics display would require an extremely large memory to represent digital values for each pixel of a graphics display. Such a system is too slow when initially generating digital values which represent a curve, and is also too slow when manipulating the curve, such as when the curve is rotated or relocated on the display screen. Similarly, prior art computer systems represent graphic alphanumeric characters in memory as a bit-map where each bit in the bit-map corresponds to a pixel on the display screen. The curves of the individual alphanumeric characters are defined by the bit-map data for each alphanumeric character. This requires large amounts of memory to store the bit-map data and made it difficult to manipulate the alphanumeric characters, such as changing font type or font size. Because of these problems, many computer graphics systems utilize the Bézier spline method of modeling curves. This included a method of modeling alphanumeric characters as a series of lines and Bézier splines, as is common in TrueType TM character fonts.

A Bézier spline, often referred to as a Bézier curve, is a mathematical construct for curves and curved surfaces. A commonly used Bézier curve for two-dimensional graphics systems is a quadratic Bézier curve 4 illustrated in FIG. 2. The quadratic Bézier curve 4 requires three control points, 5, 6, and 7, to define the curve 4. Once the three control points are specified, the Bézier curve 4 is defined. However, as is well known to those skilled in the art, higher order Bézier curves may be used to create highly complex curves in two, three or higher dimensions. Thus, complex Bézier curves may be represented by just a few points.

While Bézier curves permit a curve to be defined by a small set of data points, when the Bézier curve itself is to be displayed on the display screen, the data values for each pixel used to trace out the curve must be specified. Since determining each and every data point on a curve is a slow, computationally inefficient process, it has been found highly beneficial to approximate the Bézier curve. An advantage of doing this is that the Bézier curve can be approximated very closely by a finite set of line segments. The number of line segments required to suitably approximate the Bézier curve depends on several factors including the rate of curvature of the Bézier curve and the resolution of the display screen or printer. Approximating a curve by a finite set of line segments is called "rendering the curve."

The above discussion is equally applicable to other graphics devices as well as display screens and printers although some parameters may vary. The pixel size on a typical laser printer, for example, is different from the pixel size on a typical display screen. However, the same problems encountered in rendering a Bézier curve on a display screen are present when rendering a curve on a laser printer or any other type of graphics display.

The typical method of rendering a Bézier curve requires a determination of which pixels should be turned on and which pixels should be turned off to visually represent a curved line. Note that the terms turning on and off simply refer to the fact that the pixels have two opposite binary logic states. It is obvious that a pixel that is turned on may create a lighted area on a display screen or a darkened area on the printed page, depending on the particular display mode (e.g., reverse video). For purposes of this application, turning a pixel on refers to the process of creating a visible dot on the display screen or printed page at the position of the pixel. Similarly, turning a pixel off refers to the process of leaving the particular pixel invisible on the display screen or printed page.

To render a Bézier curve in the prior art, the curve is first broken into a series of line segments each with a length dependent on such factors as the rate of curvature and the resolution of the graphic display. Systems of the prior art must then determine which pixels should be turned on to approximate the line segments that are used to approximate the Bézier curve. Line rendering procedures generally use the well-known Bresenham algorithm or some variant thereof. This technique generates line segments of variable length to approximate the Bézier curve. A portion of the Bézier curve with a slow rate of curvature can be approximated by longer line segments than a portion of the Bézier curve with a high rate of curvature. However, rendering line segments of variable length can be a slow tedious process that requires many computations.

Therefore, it can be appreciated that there is a significant need for a system and method for rendering Bézier curves without the need for a long computational process.

SUMMARY OF THE INVENTION

The present invention is embodied in a computer system for rendering an Nth order curve defined by N+1 control points on a graphic display unit. The graphic display unit uses a first series of pixels arranged in a first dimension and a second series of pixels arranged in the second dimension to define a two-dimensional array of pixels. The graphic display unit scans the pixel array in the first dimension to display the curve, each pixel being defined by a first and second opposite binary logic states. The computer system uses a coordinate system in the first and second dimensions having a selected unit of measurement with a resolution greater than one pixel. The computer system comprises a line segment generator which uses the control points to subdivide the curve into a plurality of line segments with each line segment having a length no greater than a predetermined number of pixels and first and second end points. In the preferred embodiment, the line segments are no more than one or two pixels in length. Each of the end points has a first and second coordinates indicating the location of the end points in the first and second dimensions, with the coordinates being expressed in the selected units of measurement.

A pixel analyzer sequentially analyzes the pixels in each of the first pixel series of the pixel array to determine if one of the line segments crosses a first center axis of the first pixel series being analyzed. If a line segment does cross the first center axis, the pixel analyzer generates first, second, and third index pointers. The first index pointer corresponds to the distance from the first end point to the second end point of the line segment in the first dimension. The second pointer corresponds to the distance from the first end point to the second end point of the line segment in the second dimension. The third pointer corresponds to the distance from the first end point to the first center axis in the second dimension, with the first, second, and third pointers being expressed in the selected units. If the line segments are greater than one pixel in length, the pixel analyzer also determines if any of the line segments cross a first center axis of an adjacent first pixel series and, if so, the pixel analyzer subdivides the line segment until each of the subdivided line segments crosses only one first center axis. Each of the subdivided line segments is defined by first and second end points having first and second coordinates indicating the location of the end points in the first and second dimensions.

A data look-up table contains a plurality of distance values expressed in the selected units corresponding to a range of possible distances in the first dimension from a second center axis of one of the second pixel series to the point at which the line segment crossing the first center axis. A final address pointer indicates a particular location in the look-up table which contains a distance value for the particular line segment which crosses the first center axis in the first pixel series being analyzed. First, second, and third index tables are used to generate the final address pointer. Each of the index tables contains a number of index table locations selected to correspond to the range of possible values of the first, second, and third index pointers, respectively. The first, second, and third index pointers indicate particular index table locations within the first, second, and third index tables, respectively. The system also includes address means for generating the final address pointer from the index values from the particular locations in the index tables indicated by the first, second, and third index pointers.

A rasterizer adds the distance value from the data look-up table to the coordinate of the first end point in the first dimension. The rasterizer changes the binary logic state of the pixel if the sum of the distance value and the coordinate of the first end point in the first dimension is less than the value of the second center axis.

In one embodiment, the index tables contain index data values that are preweighted to include a multiplication factor, thereby avoiding multiplication operations in generating the final address pointer. An adder receives the index data values from the locations in the index tables pointed to by the first, second, and third index points, respectively, and adds the data index values to generate the final address pointer.

The first, second, and third index table locations may contain index values which include a division factor to reduce the resolution from the predetermined resolution to a second lower resolution. The first, second, and third index table locations may also contain index data values that are nonlinear to compensate for errors introduced from the resolution reduction.

BRIEF DESCRIPTION OF THE DRAWINGS

FIGS. 11-13 are tables illustrating the nonlinear data values of the index tables of the present invention.

DETAILED DESCRIPTION OF THE INVENTION

The present invention provide a system and method for easily rendering curves. While the examples presented herein relate to Bézier curves, the principles of the present invention are not limited to Bézier curves, but are applicable to any spline or curve. It is particularly useful when rasterizing graphic displays. A raster is a predetermined pattern of lines that provide uniform coverage of a display area. As previously discussed, a typical raster comprises a series of horizontal scan lines one pixel high. Each horizontal scan line, in turn, is comprised of a series of pixels. Rasterization is a process in which the Bézier curve is transformed into a series of pixels on a display screen, printer, or the like. The present invention is easily implemented on any computer.

Any system, whether prior art systems or the present invention, must determine which pixels to turn on and off. Because the typical raster scans in the horizontal direction, the present invention sequentially analyzes each horizontal scan line to determine which pixels in a particular horizontal scan line will be turned on or off. A pixel will change binary logic states (i.e., turn on or off) if a line segment approximation of the Bézier curve passes through the pixel to the left of the center point of the pixel. Subsequent pixels in the horizontal scan row will be assigned the same binary logic state as the pixel in which the line segment passed through the pixel to the left of the center point until another pixels is encountered in which a line segment approximation passes through the subsequent pixel to the left of the center point of the subsequent pixel. At that point the subsequent pixel (and pixels following the subsequent pixel) are all assigned the same binary logic state as the subsequent pixel.

Figure 1:
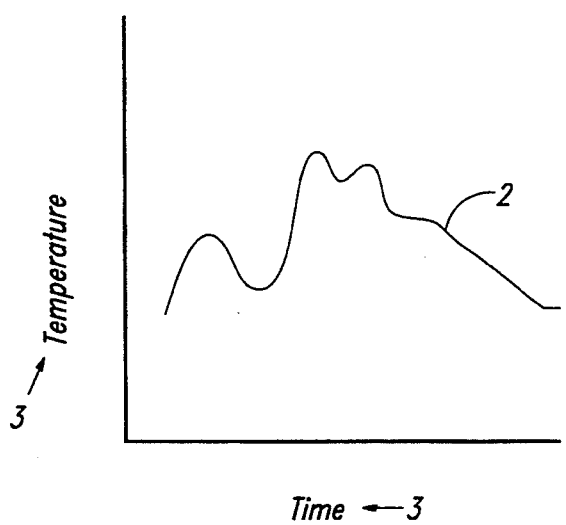
FIG. 1 illustrates a typical graphic display that may be displayed on a computer display screen or graphics printer.
Figure 2:
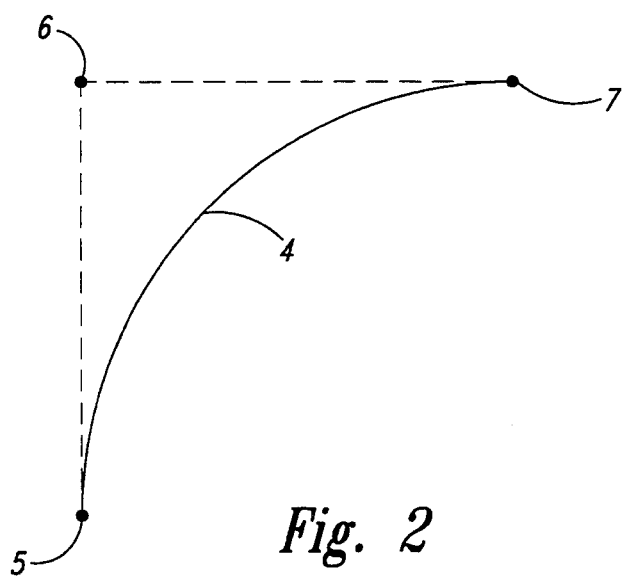
FIG. 2 depicts a typical quadratic Bézier curve.
Figure 3:
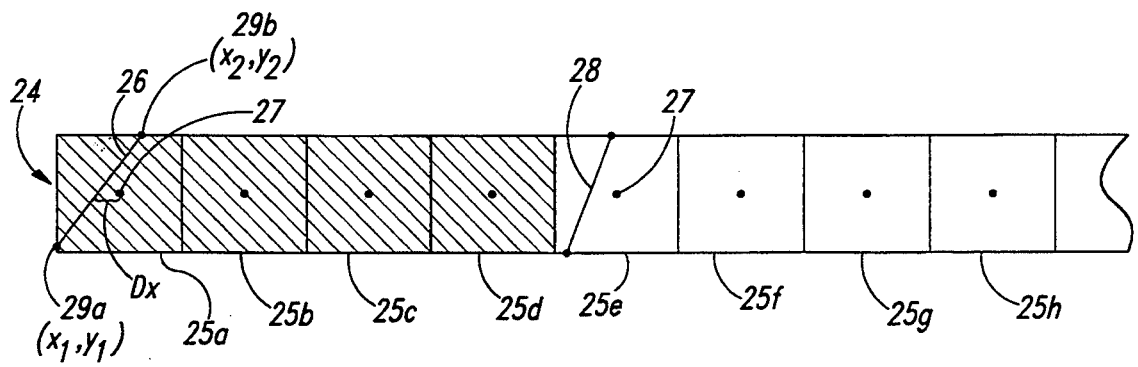
FIG. 3 illustrates a technique used by prior art systems and the present invention to determine which pixels to turn on and off.

For example, the horizontal scan line 24 in FIG. 3 initially has all pixels turned off. The pixel 25a has a line segment 26 passing through the pixel to the left of the center point 27 of the pixel. Thus, the rasterization process will cause pixel 25a to change logic states and turn on in this example. The pixels 25b, 25c, and 25d that follow the pixel 25a will also be turned on because no line segments pass through these pixels. However, the pixel 25e has a line segment 28 passing through the pixel to the center point 27 of the pixel 25e. Thus, the rasterization process will cause pixel 25e to change logic states and turn off. The pixels 25f, 25g, and 25h, which follow pixel 25e, also are turned off because no line segment passes through the pixels 25f, 25g, and 25h. This process is repeated for all horizontal scan rows.

The rasterization process must accurately determine where a line segment passes through a pixel. To accurately determine where a line segment passes through a pixel, systems perform calculations with a resolution greater than one pixel. Typically, calculations are performed with 1/64 pixel resolution. The end points 29a and 29b of the line segment 26 are each defined by a pair of coordinates $(x_1, Y_1)$, and $(x_2, Y_2)$, respectively. The horizontal distance from the center point 27 of the pixel to the line segment 26 is defined as $D_X$.

Some systems of the prior art have attempted to use look-up tables containing data values for $D_X$. Prior art look-up tables typically use the coordinates of the end points of a Bézier curve line segment as indices to the look-up table. Thus, prior art systems require four separate indices (i.e., the $x_1$, $y_1$, $x_2$ and $y_2$ values) to determine a value for $D_X$. If the prior an system performs 1/64 pixel resolution calculations, and uses four indices, there would be $64^4$ possible data values. Obviously, a data table with more than 16 million data values is not useful. In contrast, the present invention uses only three indices, $\Delta x_L$, $\Delta y_L$, and $\Delta s_y$ instead of using $x_1$, $y_1$, $x_2$, and $y_2$ values typically used by the prior art, thus making the look-up process more manageable. The indices $\Delta x_a$, $\Delta y_a$ and $\Delta s_y$ will be described in detail below.

A table look-up technique works in this application because the line segments approximating the Bézier curve are all very short. The line segments in the present invention are all guaranteed to be no greater than two pixels in length. This minimizes the number of data values required to accurately determine the value for $D_X$. In addition, the line segments are all of about the same length (i.e., less than two pixels long) as opposed to variable line segment lengths found in the Bresenham technique. This makes a look-up table convenient to use. Furthermore, the resolution of the look-up table in the presently preferred embodiment is reduced to ⅛. Thus, the total number of data values in the data look-up table of the present invention is 1377. This size of a data table is manageable.

Figure 4A:
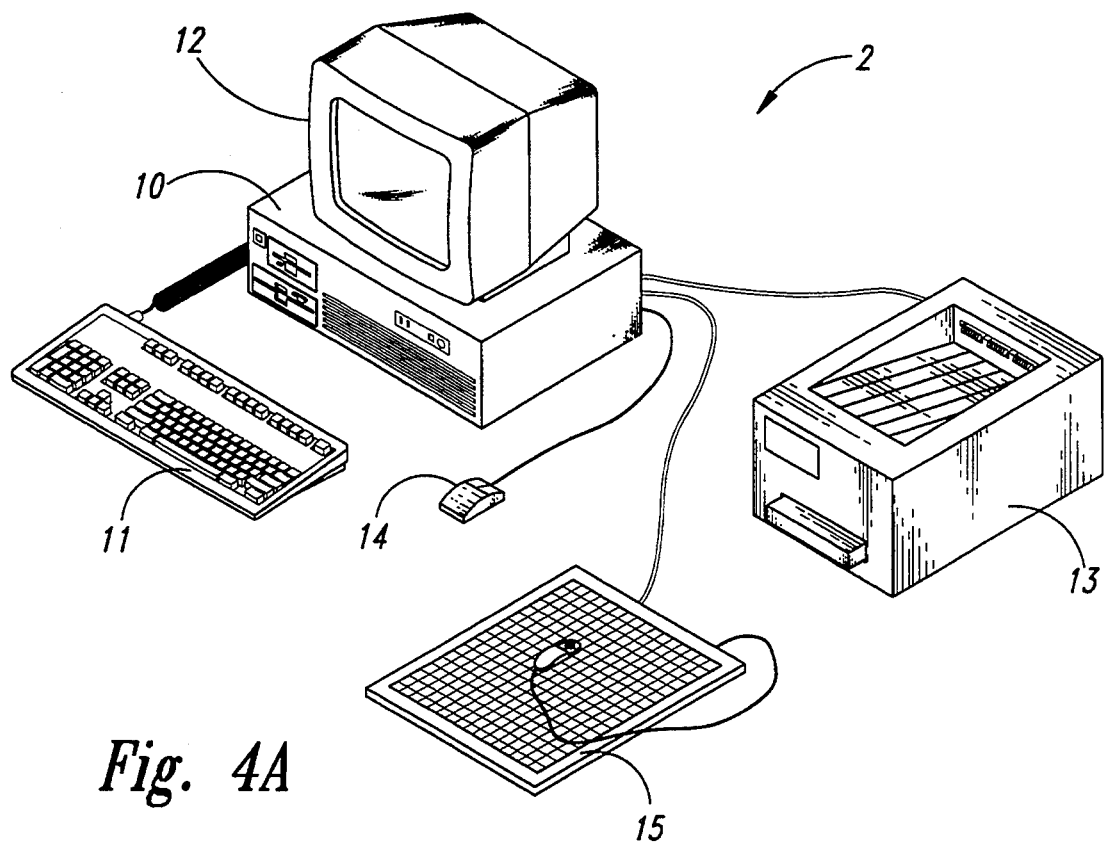
FIG. 4A depicts a computer graphics system embodying the present invention.

A computer system 2 implementing the present invention is shown in FIG. 4A as having a computer 10 with a keyboard 11 and a display screen 12. Graphic images may be displayed on the display screen 12 but the computer system 2 may include other graphics devices such as a printer 13. Graphic data may be created by the keyboard 11, but the computer system 2 may include a mouse 14 or other pointing device, a digitizing tablet 15, or the like. The principles of the present invention relate to the display and printing of graphic images.

Figure 4B:
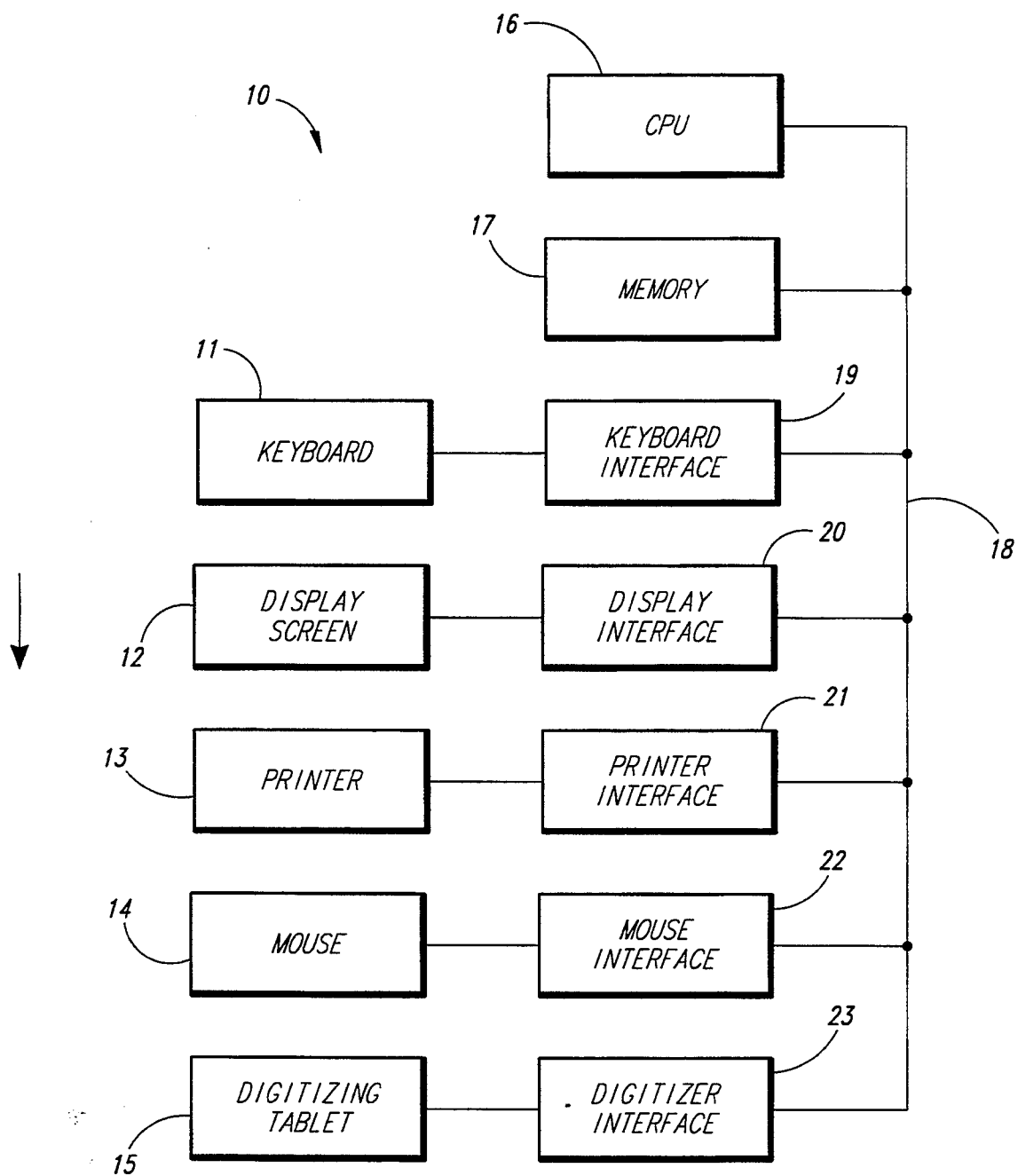
FIG. 4B is a functional block diagram of the computer system of FIG. 4A.

The computer 10 has a central processor unit (CPU) 16, a memory 17, and a bus 18 carrying information and control signals, as shown in FIG. 4B. In addition, the computer 10 has a keyboard interface 19 coupling the computer 10 to the keyboard 11. Other interfaces include a display interface 20 coupling the computer 10 to the display screen 12, a printer interface 21 coupling the computer to the printer 13, a mouse interface 22 coupling the computer to the mouse 14, and a digitizer interface 23 coupling the computer to the digitizing tablet 15. Each of these interfaces 19, 20, 21, 22 and 23 is coupled to the CPU 16 and the memory 17 by the bus 18. Each interface provides the appropriate data and control signals that allow the proper operation of the respective coupled devices with the computer 10.

The Bézier control points for a Bézier curve may be determined in a number of ways well known to those skilled in the art. For example, if the graphic image to be displayed is an alphanumeric character that is typed in using the keyboard 11, such as a TrueType ™ font character, the Bézier control points are determined by the particular character and font to be displayed and the location at which the character will be displayed. Alternatively, a Bézier curve may be created using the mouse 14, or the digitizing tablet 15. The actual generation of the Bézier control points is well known in the art and will not be discussed herein.

Figure 5:
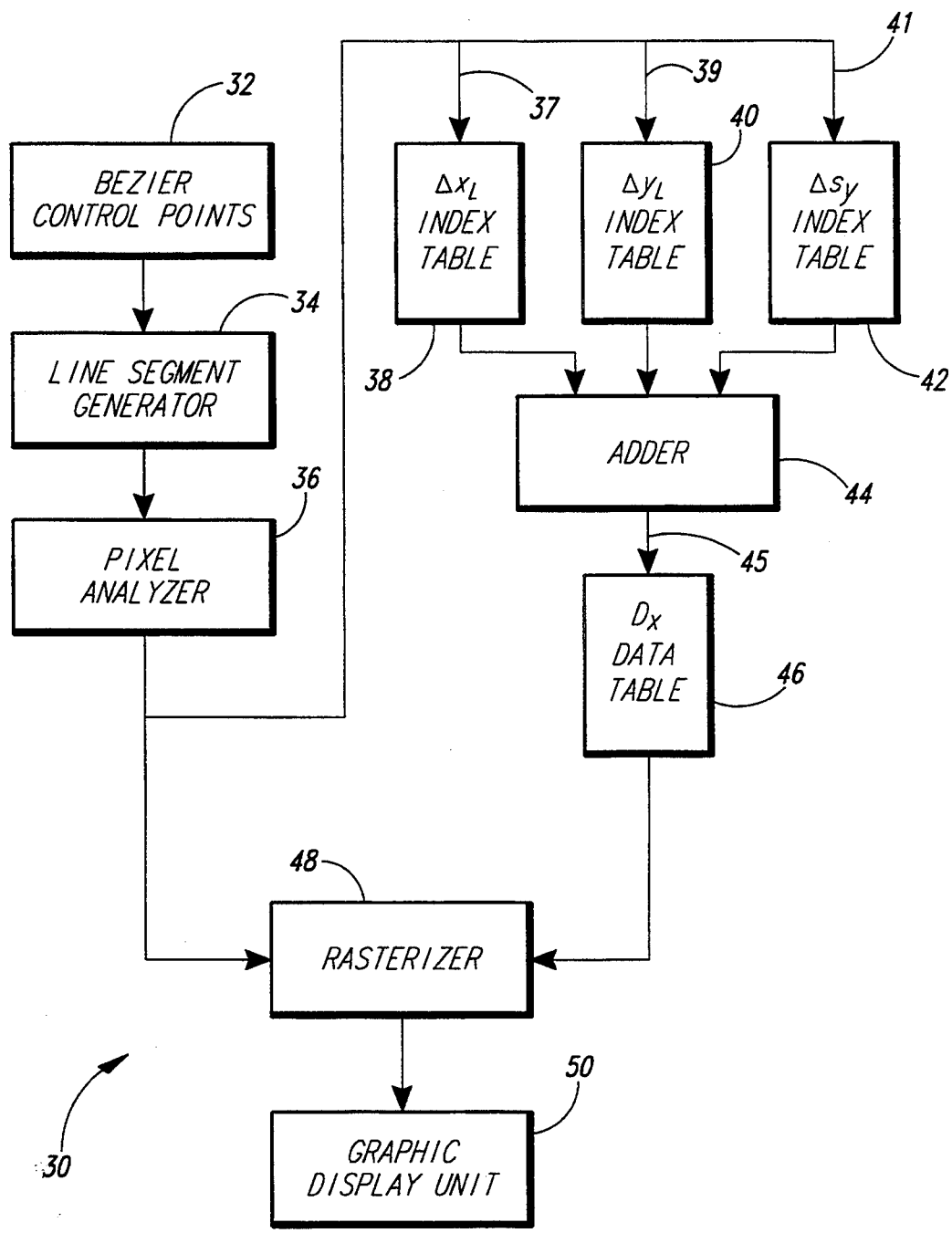
FIG. 5 is a functional block diagram of the inventive system.

A system portion 30 of the computer system 2 of the present invention is shown in the functional block diagram of FIG. 5. Bézier control points 32, which are stored within the memory 17 (FIG. 4B), are provided to the system portion 30. A line segment generator 34 within the computer 10 receives the Bézier control points 32 and generates a series of line segments to approximate the Bézier curve. For purposes of the calculations, the system portion 30 divides each pixel into a predetermined number of subpixels. The present invention divides each pixel into 64 subpixels to provide 1/64 pixel resolution, but rounds off the numbers to ⅛ pixel resolution to reduce the data storage requirements, as will be described below.

In the preferred embodiment of the present invention, the Bézier curve is broken into a series of line segments of equal length no greater than the length of two pixels. However, the line segment generator 34 could also generate line segments no greater than one pixel in length. Two pixel length line segments are rasterized more rapidly than one pixel length line segments, but the process requires an extra processing step that will be described in detail below. It should be noted that other line segment lengths could also be used. For example, line segments of three or more pixels in length could be used, but the size of the data look-up table increases, and the system portion 30 must perform an extra processing step that will be described in detail below. By using only short line segments, the present invention may use table look-up techniques to determine whether a particular pixel should be turned on or not. This approach avoids the need to use the Bresenham technique of rendering variable line segment lengths.

A pixel analyzer 36 sequentially analyzes each pixel in a horizontal scan row. If the pixel analyzer 36 determines that a line segment crosses a horizontal axis passing through the center point of a pixel, that particular pixel must be analyzed in more detail. The horizontal axis for each horizontal scan row is defined by an imaginary horizontal straight line passing through the center point of each of the pixels in that horizontal scan row.

For pixels requiring more detailed analysis, the pixel analyzer 36 uses the end points of the line segment and the vertical distance from one end point to the center point of the pixel to determine three index pointers 37, 39, and 41, represented by input lines in FIG. 5. The method used to determine the values for the three index pointers 37, 39, and 41 will be discussed below. The index pointers 37, 39, and 41 point to locations within a set of three index tables 38, 40, and 42, respectively. The index tables 38, 40, and 42 are stored within the memory 17 (FIG. 4B) of the computer 10. The three values contained in the index tables 38, 40, and 42 at the particular locations pointed to by the three index pointers 37, 39, and 41 are added together by an adder 44. The resulting sum generated by the adder 44 provides a data pointer 45 to a location in a data look-up table 46. The data look-up table 46 is also stored in the memory 17 of the computer 10. The value contained within the data look-up table 46 at the particular location pointed to by the data pointer 45 is used to determine whether that particular pixel should be turn on or off.

A rasterizer 48 within the computer 10 uses the data generated by the pixel analyzer 36 and the data look-up table 46 to generate pixel control data used to turn on pixels in a horizontal scan row. As previously stated, if the line segment crosses the horizontal centerline of a particular horizontal scan row to the leer of the center of a pixel, that pixel is turned on. Subsequent pixels in the horizontal scan row are also turned on until the system portion 30 encounters a pixel in which the line segment passes through the horizontal centerline to the leer of the center of the pixel. That pixel, and all subsequent pixels in the horizontal scan line are turned off, and the process is repeated for each horizontal scan line. It should be noted that the system portion 30 could use a different decision criteria, such as a line segment passing through the horizontal centerline to the fight of a center of a pixel.

The pixel control data is received by a graphics display unit 50, which generates the graphic image. As previously discussed, the graphics display unit 50 may be any graphics device such as the display screen 12 or the printer 13 shown in FIG. 4A, or the like. The pixel control data is provided to the graphics display unit 50 in the format required by the interface for the particular graphics device. For example, if the graphics display unit 50 is the display screen 12, the pixel control data is processed by the display interface 20. Similarly, if the graphics display unit 50 is the printer 13, the pixel control data is processed by the printer interface 21.

Figure 6:
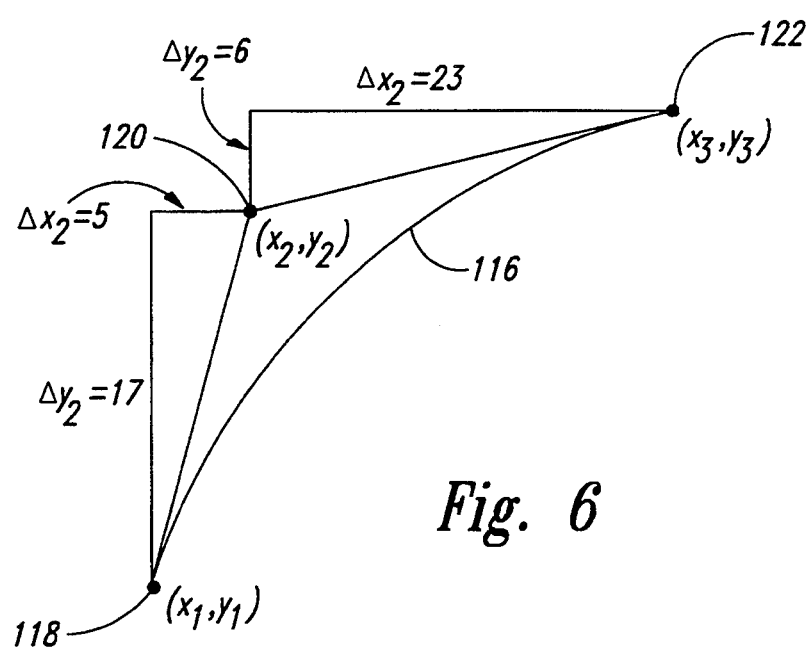
FIG. 6 is a Bézier curve subdivided according to the principles of the present invention.

The inventive method involves subdividing the Bézier curve into a series of straight line segments by the line segment generator 34. The line segments are of equal length of less than two pixels. The system portion 30 must determine the minimum number of steps in which to subdivide the Bézier curve to assure that no line will be greater than two pixels in length. The inventive method for performing this process on the Bézier curve 116 of FIG. 6 is illustrated by the flow chart of FIG. 7. For purposes of the example of FIG. 6, the Bézier curve is a second order Bézier curve, which is defined by three control points. However, the inventive system and method are equally useful for rendering Bézier curves of any order. As illustrated in FIG. 6, the Bézier curve 116 is defined by three Bézier control points 118, 120, and 122. The control point 118, sometimes referred to as an end point, has coordinates ($x_1$, $y_1$), which define its location on the graphics display unit 50 (see FIG. 5). Similarly, Bézier control points 120 and 122 have coordinates ($x_2$, $y_2$) and ($x_3$, $y_3$), respectively. At the start 100 of the process, the Bézier control points 118, 120, and 122 are already defined and stored in the memory 17 (see FIG. 5). As previously stated, the system portion 30 performs calculation with 1/64 pixel resolution before rounding off to $\frac{1}{8}$ pixel resolution. Therefore, the coordinates of the Bézier control points are provided to the system portion 30 with 1/64 pixel resolution.

Figure 7:
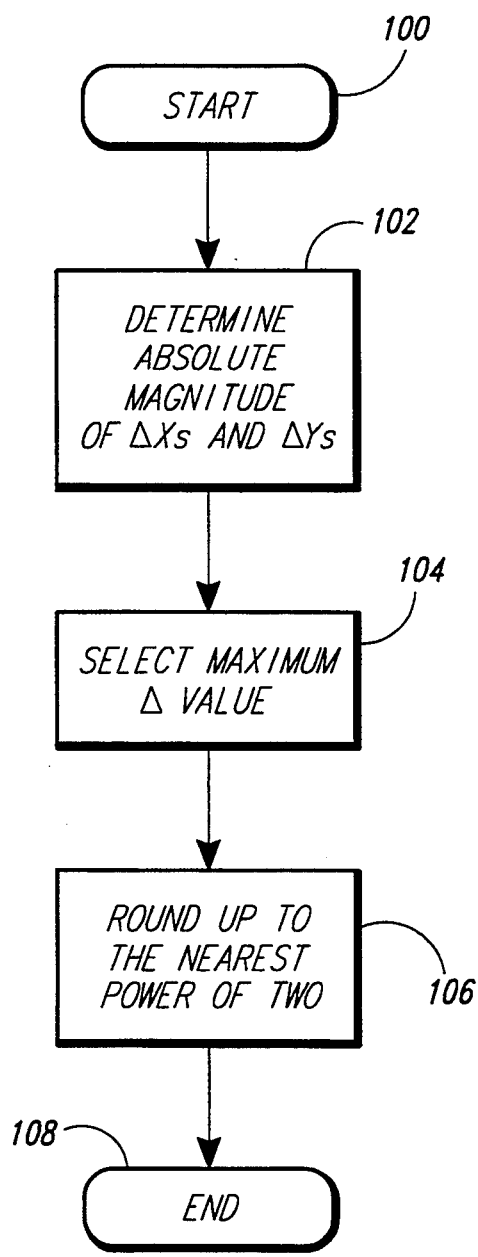
FIG. 7 is a flow chart illustrating a portion of the inventive method for subdividing a Bézier curve.

In step 102 of FIG. 7, the line segment generator 34 (see FIG. 5) determines the distance between Bézier control points in both the vertical and horizontal directions. The system portion 30 separately determines the absolute magnitude of the change in the "X" and "Y" coordinates from one Bézier control point to the next. The formulae shown below illustrate one technique for performing this operation:

$$\Delta x_1 = |x_1 - x_2|;$$

$$\Delta y_1 = |y_1 - y_2|;$$

$$\Delta x_2 = |x_2 - x_3|; \text{ and}$$

$$\Delta y_2 = |y_2 - y_3|.$$

For the Bézier curve 116 of FIG. 6, the following values are calculated by step 102: $\Delta x_1 = 5$, $\Delta y_1 = 17$, $\Delta x_2 = 23$, and $\Delta y_2 = 6$. It should be noted that other known methods for determining the distances between the Baler control points may also be used with the present invention. For Bézier curves of a higher order, there will be more control points and, therefore, more $\Delta x$ and $\Delta y$ values. For an Nth order Bézier curve, there are $N+1$ control points, which results in values $\Delta x_1$ to $\Delta x_N$, and $\Delta y_1$ to $\Delta y_N$. The system portion 30, in step 102, determines the value for all distances, $\Delta x_1$ to $\Delta x_N$, and $\Delta y_1$ to $\Delta y_N$. Subsequent steps are identically performed on Bézier curves of any order.

In step 104, the system portion 30 selects the maximum value for any of the $\Delta x$ or $\Delta y$ values determined above. Step 104 will select $\Delta x_2 = 23$ as the maximum of the four values for the Bézier curve 116. Note that if a single pixel length line segment is desired, the maximum value in step 104 is multiplied by 2 to determine the minimum number of steps. If other line segment lengths are used, step 104 is adjusted accordingly.

Because calculations on a computer are performed on binary numbers, the system portion 30, in step 106, rounds up the value selected in step 104 to the next highest binary number so that subsequent calculations may be more easily performed by the computer. Thus, the minimum number of steps required by the presently preferred embodiment is a power of two. Note that the value is never rounded down to the nearest binary number since that would create the possibility that the line segments are greater than two pixels in length. For the Bézier curve 116, step 106 rounds up from 23 to 32, which is the next highest power of two. Thus, the Bézier curve 116 will be subdivided into 32 line segments to assure that no line segment is greater than two pixels in length. Step 108 ends the process of determining the minimum number of steps required.

Once the minimum number of steps is determined, as described above, the Bézier curve is subdivided into straight line segments by a technique known as forward differencing. The process of forward differencing is well known to those of ordinary skill in the an and will not be discussed herein. After the Bézier curve has been subdivided into a series of short line segments, each with an equal length of no greater than two pixels, the coordinates of the end points for each line segment are known.

Once the end points of the line segments have been determined, it is necessary to determine whether pixels through which the line segments pass should be turned on. The pixel analyzer (see FIG. 5) sequentially analyzes each horizontal scan row until it encounters a pixel in which a line segment crosses the horizontal axis of the horizontal scan row. As an illustration, consider Bézier curves 60 and 62 of FIG. 8A, which form part of a graphic object 64, such as an alphanumeric character or any graphic curve. The Bézier curves 60 and 62, which define the upper and lower boundaries of the graphic object 64, respectively, occupy several horizontal scan rows 66a–j. A portion 68 of the graphic object 64, shown in the enlargement of FIG. 8B, covers part of five horizontal scan rows 66a to 66e. The shaded portion of FIG. 8B indicates the portion of the display screen 12 that theoretically should be lighted to accurately display the graphic portion 68. However, a portion of a pixel cannot be lighted; only the entire pixel can be lighted.

Figure 8A:
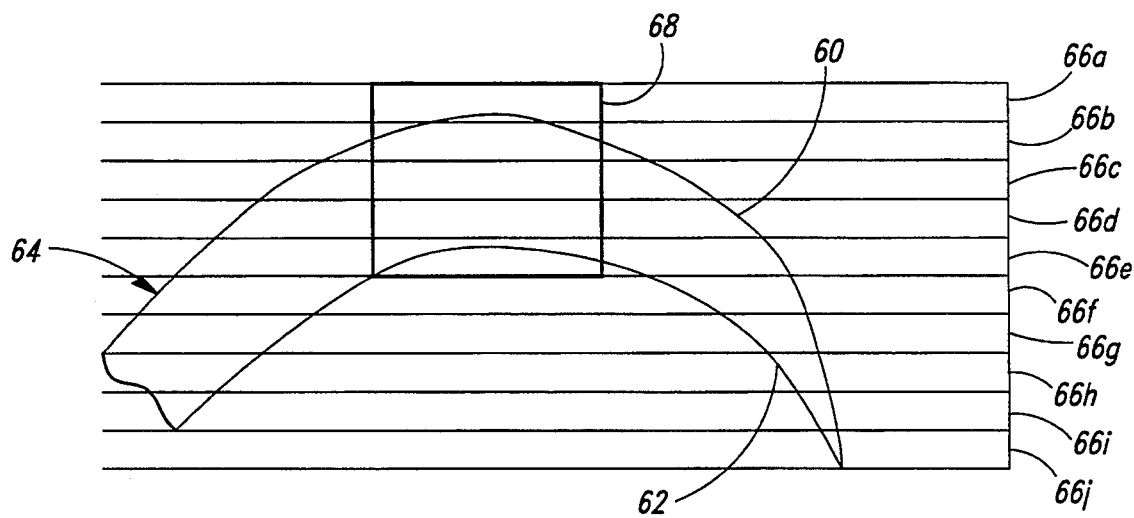
FIG. 8A depicts part of a graphic character displayed on the display screen of FIG. 4A.
Figure 8B:
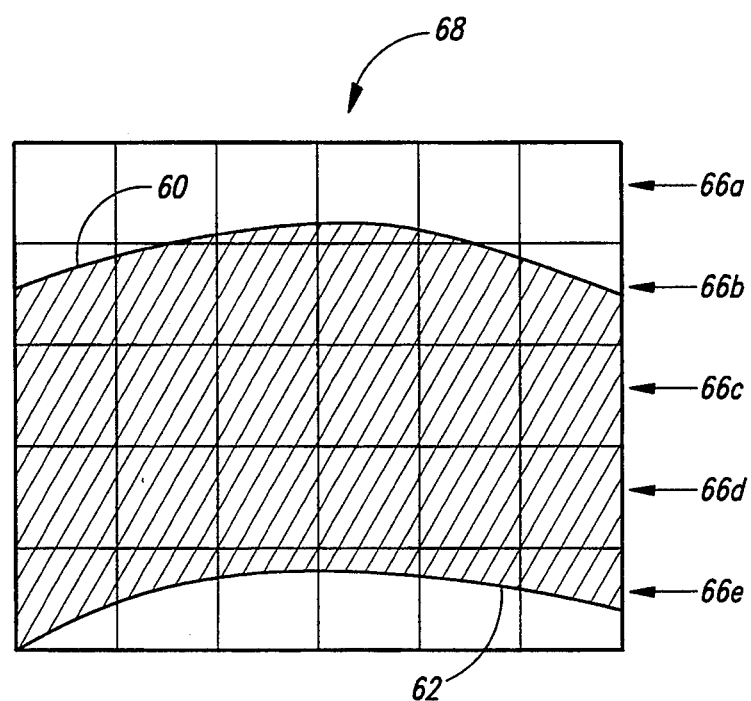
FIG. 8B depicts a magnified portion of the graphic character of FIG. 8A.
Figure 8C:
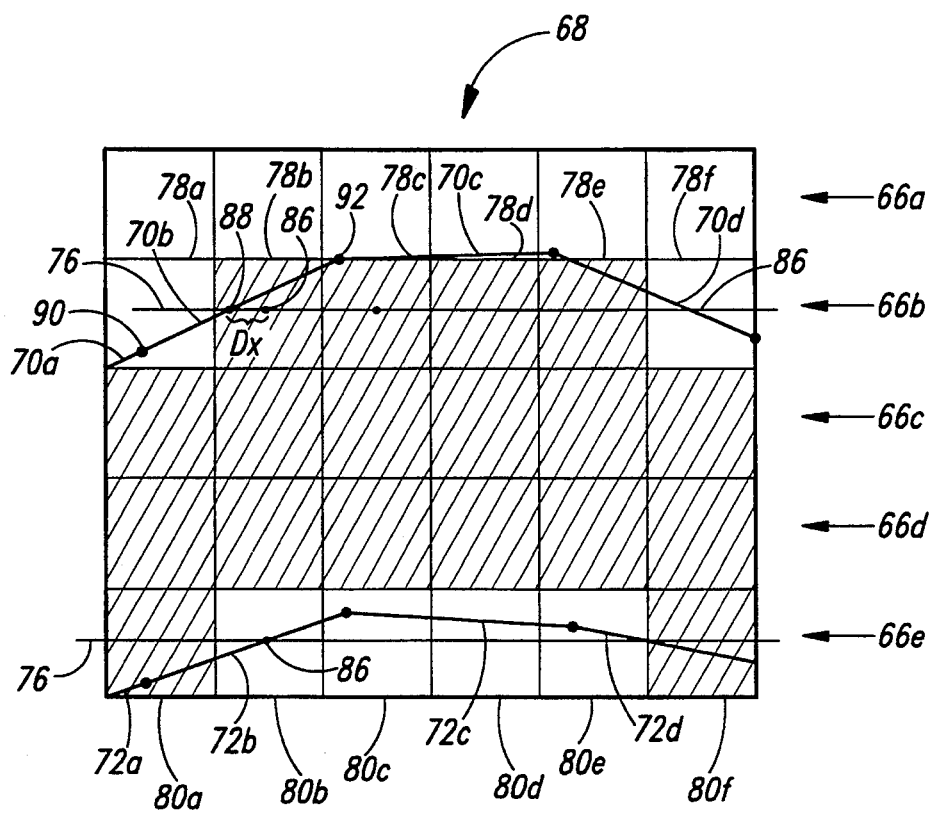
FIG. 8C illustrates the rasterization process of the magnified portion of FIG. 8B according to the principles of the present invention.

In FIG. 8C, the straight line segments 70a–d, and 72a–d, each of a length of less than two pixels are shown. The line segments are generated by the line segment generator 36 (see FIG. 5) to approximate the enlarged portion 68 of FIG. 8B. The line segments 70a–d approximate the upper boundary 60 of the portion 68 while the line segments 72a–d approximate the lower boundary 62 of the portion 68. To accurately approximate the graphic display, the system portion 30 lights pixels below the line segments 70a–d approximating the Bézier curve 60 and pixels above the line segments 72a–d approximating the Bézier curve 62. In the presently preferred embodiment, a pixel is lighted if the center point of the pixel falls within the boundaries defined by the line segments 70a–d and 72a–d. If a line segment does not cross a horizontal axis 76 of the horizontal scan row in which a pixel is located, it is not necessary to analyze the pixel. That particular pixel will be turned on or off on the basis of other pixels in the horizontal scan row in which line segments do cross the horizontal axis. The shaded area of FIG. 8C indicates the pixels that will be lighted by the system portion 30.

As previously noted, when a pixel in the horizontal scan row is turned on, all subsequent pixels in the horizontal scan row 66b will also be turned on until the system portion 30 encounters the next line segment that crosses the horizontal axis to the left of the center 86 of a pixel. This is because the center points of these subsequent pixels are all contained within the boundary of the graphic object defined by the line segments. Similarly, if pixels in a horizontal scan row are turned on and the system portion 30 encounters a pixel in which a line segment passes through the horizontal centerline to the left of the center point of the pixel, that pixel and subsequent pixels will be turned off. This is because the center point of the pixel and subsequent pixels are not contained within the boundary of the graphic object defined by the line segments. Therefore, a line segment crossing the horizontal axis to the left of the center 86 of a pixel causes the pixel to change logic states (i.e., lighted to nonlighted or nonlighted to lighted). Thus, in the example of FIG. 8C, the pixel 78b is turned on based on the analysis described above. Pixels 78c–d are also turned on because no line segment crosses the horizontal axis 76 of these pixels. However, pixel 78f, and subsequent pixels in the horizontal scan row 66b are turned off because the line segment 70d crosses the horizontal axis 76 to the left of the center 86 of pixel 83.

Similarly, the line segments 72a–d approximate the Bézier curve 62, which comprise the lower boundary (see FIG. 8A) of the graphic object 64. The system portion 30 conducts the same analysis as described above. For example, the pixel 80a of horizontal scan row 66e will be turned on due to analysis of pixels to the left of the graphic portion 68 shown in FIG. 8C. The pixel 80b will be turned off because the line segment 72b crosses the horizontal axis 76 of the horizontal scan row 66e to the left of the center 86 of the pixel 80b. This indicates that the center 86 of the pixel 80b is not contained within the lower boundary defined by the line segment 72b. Subsequent pixels 80c–e are not lighted because the line segments 72c and 72d do not cross the horizontals axis 76 of the horizontal scan row 66e within these pixels. The pixel 80f of the horizontal scan row 66e is lighted because the line segment 72d crosses the horizontal axis 76 of the horizontal scan row 66e to the left of the center 86 of the pixel 80f indicating that the center 86 of the pixel 80f is contained within the boundary defined by the line segment 72d. The process is repeated for all horizontal scan rows. It should be noted that all pixels in the horizontal scan rows 66c–d of the portion 68 are lighted in FIG. 8C. As can be seen in FIG. 8A, the pixels in horizontal scan rows 66c–d are lighted due to the analysis of pixels outside the portion 68. However, the same analysis described above is performed on each horizontal scan row of the raster.

Alternatively, the system portion 30 could initially analyze the line segments 70a–d and 72a–d to determine which line segments cross the horizontal axis 76 of any horizontal scan row 66a–e. Then the system portion 30 could analyze only the pixels in which a line segment crosses a horizontal axis. While this approach requires a separate analysis, it eliminates the need to analyze each pixel in each horizontal scan row.

In the presently preferred embodiment, the system portion 30 determines if a line segment crosses the horizontal axis by simply analyzing the "Y" coordinates of the end points of the line segment and the "Y" coordinate of the horizontal axis 76 for the horizontal scan row currently being analyzed. If one of the line segments 70a–d crosses the horizontal axis, the "Y" coordinates of the end points of the line segment will encompass the "Y" coordinate of the horizontal axis, as will be explained below.

Figure 8D:
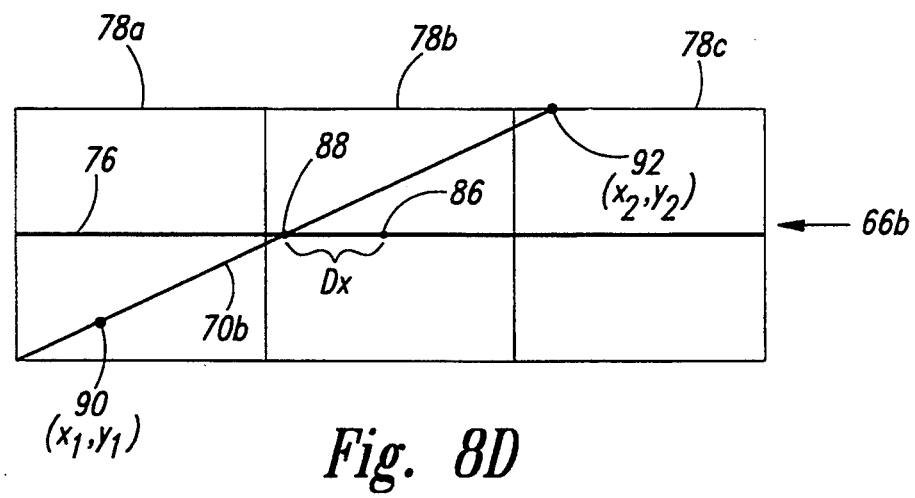
FIG. 8D illustrates the rasterization process with a single pixel of FIG. 8C.

For example, consider the line segment 70b shown enlarged in FIG. 8D, which shows the pixels 78a–c of FIG. 8C magnified. The line segment 70b is defined by end points 90 and 92 having the coordinates ($x_1$, $y_1$) and ($x_2$, $y_2$), respectively. To determine whether the line segment 70b crosses the horizontal axis 76 of the horizontal scan row 66b, the system portion 30 determines whether the "Y" coordinate of the horizontal axis 76 falls within the "Y" coordinates of the leftmost and rightmost end points 90 and 92, respectively (i.e., whether the value of the "Y" coordinate of the horizontal axis 76 is between the "Y" values for $y_1$ and $y_2$ of the end points 90 and 92). In the example of FIG. 8C, the value of the "Y" coordinate of the horizontal axis 76 is greater than $y_1$ but less than $y_2$. Therefore, the line segment 70b is known to cross the horizontal axis 76. Because the line segment 70b crosses the horizontal axis 76, the system portion 30 must precisely determine the point at which the line segment 70b crosses the horizontal axis 76. Specifically, the system portion 30 must determine the horizontal distance $D_X$ from the center 86 of the pixel 78b to the point 88 at which the line segment 70b crosses the horizontal axis 76. The pixel 78b will be lighted if the line segment 70b crosses the horizontal axis 76 to the left of the center 86 of the pixel 78b or through the center, but not if it crosses to the fight of the center. The distance $D_X$ is determined and added to the "X" coordinate, $x_1$, of the end point 90 to determine the point at which the line segment 70b crosses the horizontal axis 76. If the resulting sum is less than or equal to the "X" coordinate for the center 86 of the pixel 78b, the line segment crosses the horizontal axis 76 to the left of the center 86 of the pixel 78b. Thus, the pixel 78b is lighted. The present invention provides a simple and fast technique for determining the distance $D_X$.

The system portion 30 uses a set of look-up tables to determine if a line segment crosses the horizontal axis 76 of a particular horizontal scan row to the left of the center 86 of the pixel. The length of the line segment in the vertical and horizontal directions and the vertical distance from one end point to the horizontal axis 76 are the three indices used in look-up tables. The system portion 30 determines the length of the line segment in the vertical direction, $\Delta y_L$, and the length of the line segment in the horizontal direction, $\Delta x_L$, in the manner discussed above. The vertical distance from one end of the line segment to the horizontal axis, $\Delta s_y$, is easily determined by subtracting the "Y" component of the leftmost end point from the "Y" component of the horizontal axis of the particular horizontal scan row. The horizontal distance from the point at which the line segment intercepts the horizontal axis to the center point of the pixel, $D_X$, is determined by use of the data look-up table 46 (see FIG. 5).

Figure 9A:
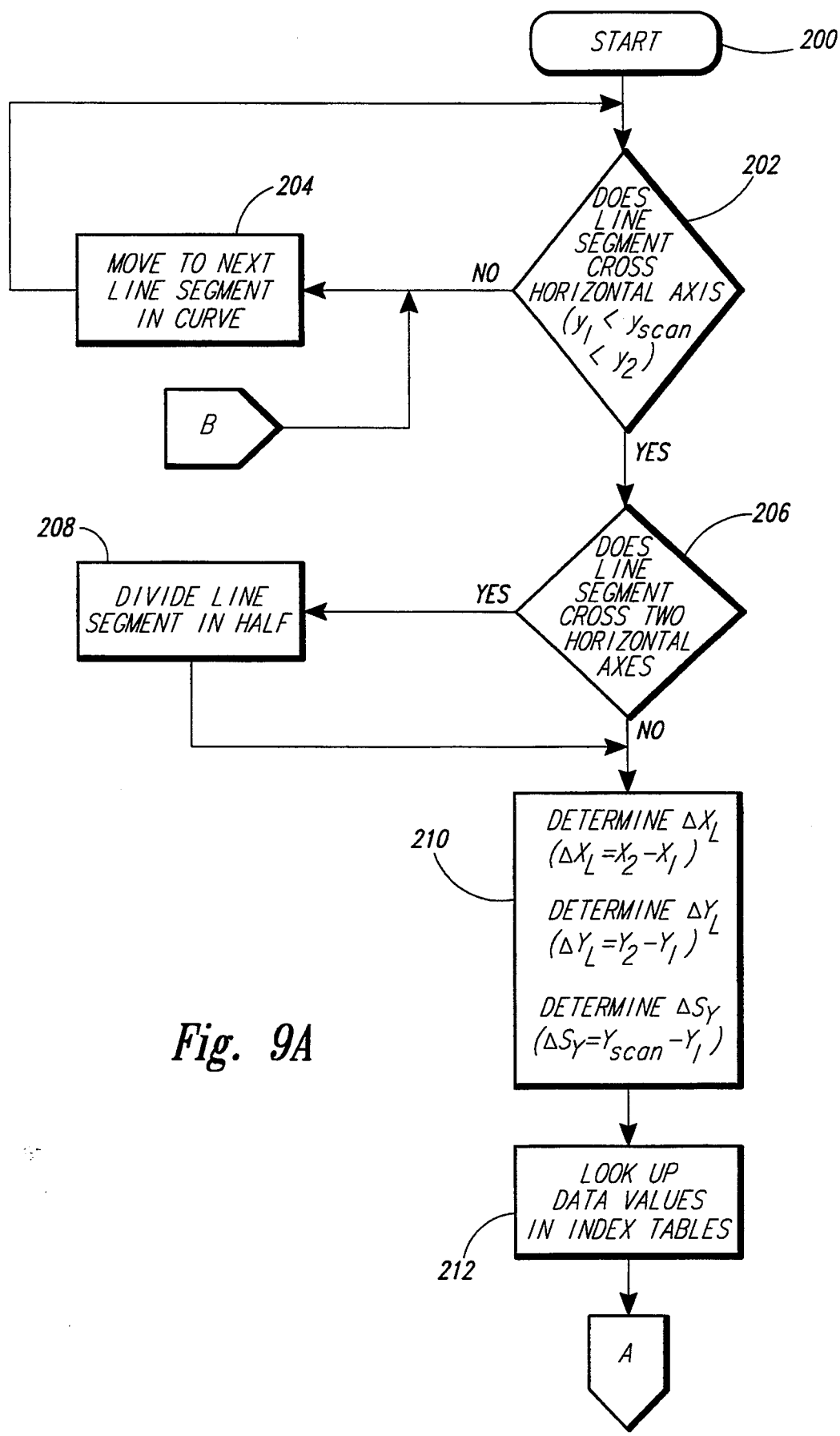
FIG. 9A is a flow chart illustrating a portion of the inventive method for rendering a Bézier curve.
Figure 9B:
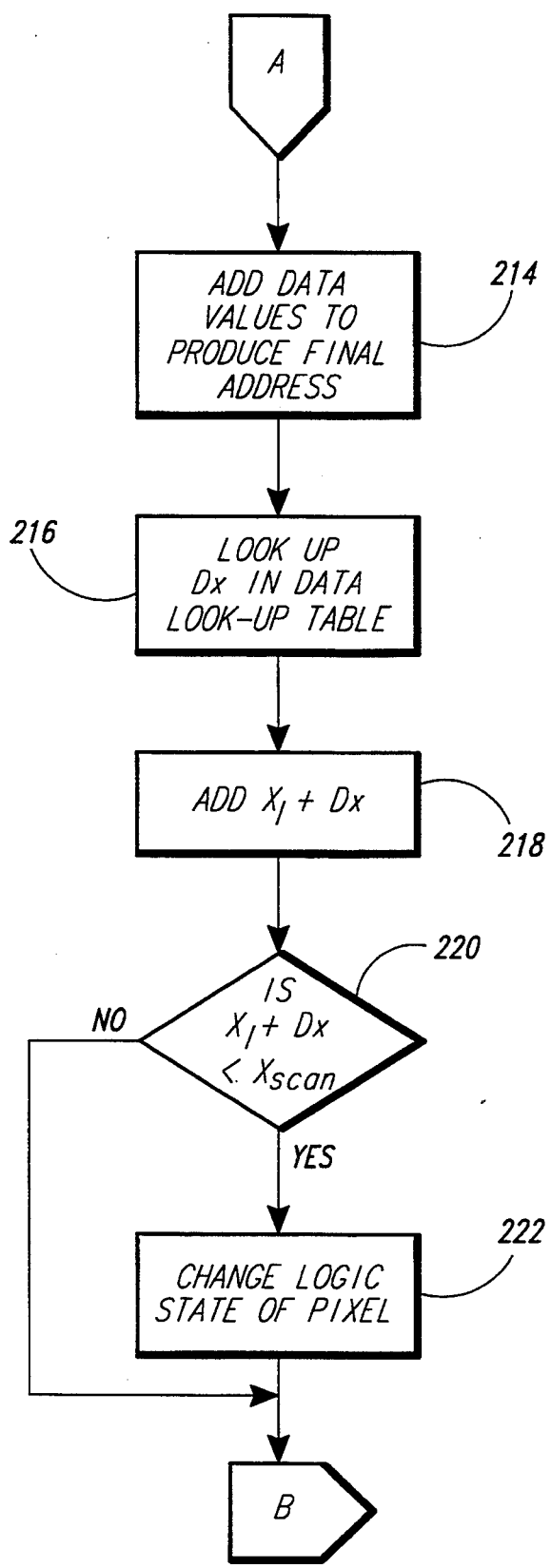
FIG. 9B is a continuation of the flow chart of FIG. 9A.

The method used by the system portion 30 to determine $D_X$ is illustrated in the flow chart of FIGS. 9A and 9B, taken in conjunction with FIG. 8D. The coordinates of the end points 90 and 92 in FIG. 8D are known to the system portion 30 by virtue of the line segment generation process discussed above and are provided to the system in step 200 of FIG. 9A. The pixel analyzer 36 will analyze pixels in detail if they contain a line segment that crosses the horizontal axis 76 of the pixel. In decision block 202, the "Y" coordinates of a line segment are examined to determine if the line segment crosses the horizontal axis 76, whose "Y" coordinate is known and is represented herein by the value $y_{scan}$. If the result of decision block 202 is NO, the system moves to the next pixel in the horizontal scan row in step 204. If the result of decision block 202 is YES, the pixel analyzer 36 will perform the above described detailed analysis of the pixel.

Before the pixel is analyzed in detail, the system portion 30 determines, in decision block 206, if the line segment crosses the horizontal axis 76 in two adjacent horizontal scan rows. If the result of decision block 206 is YES, the line segment is subdivided in half by any process well known in the art in step 208. The remainder of the steps are performed independently on each of the individual line segments. Note that this step is not required if the system portion 30 subdivided the Bézier curve so that the line segments were no greater than one pixel in length. In the example of FIG. 8D, the line segment 70b does not cross two horizontal scan lines 76, so the result of decision block 206 is NO.

The indices $\Delta x_L$, $\Delta y_L$, and $\Delta s_y$ are easily calculated from the end points of the line segment in step 210. Note that in the presently preferred embodiment, the end points of the Bézier curve are exchanged, if necessary, to cause the Bézier curve to be rendered from the bottom up. Therefore, the values for $\Delta y_L$ and $\Delta s_y$ are always positive, which reduces the number of possible data values for the index tables 40 and 42 (see FIG. 5) and the amount of storage required in the memory 17 (see FIG. 4B) of the computer 10. As a result of rendering the Bézier curve from the bottom up, the values for $\Delta x_L$ may be positive or negative depending on the slope of the line segment. Therefore, there will be twice as many data values in the index table 38 (see FIG. 5) for the value $\Delta x_L$.

In the example of FIG. 8D, the index $\Delta x_L$ is calculated by subtracting $x_2$ from $x_1$. Similarly, index $\Delta y_L$ is calculated by subtracting $y_2$ from $y_1$. The index $\Delta s_y$, the distance from the start of the line segment (i.e., ($x_1$, $y_1$)) to the center point of the scan line in the vertical direction, is calculated by subtracting $y_1$ from $y_{scan}$. The coordinates of the center 86 of the pixel being analyzed are referred to as $x_{scan}$ and $y_{scan}$. As previously discussed, these calculations are performed with 1/64 pixel resolution, although the values are rounded off to ⅛ pixel resolution as will be discussed below.

In step 212, the system portion 30 uses the calculated indices $\Delta x_L$, $\Delta y_L$, and $\Delta s_y$ as pointers to the index tables 38, 40, and 42, respectively. The data values contained in the index tables 38, 40, and 42 are determined by a table look-up process in step 212.

The data values contained in the index tables 38, 40, and 42 at the locations pointed to by the indices $\Delta x_L$, $\Delta y_L$, and $\Delta s_y$, respectively, are added together in step 214 of FIG. 9B. The value produced in step 214 is the data pointer 45. The data pointer 45 points to a location in the data look-up table 46 where the value of $D_X$ is stored. The system portion 30 uses a table look-up process in step 216 to determine the value of $D_X$.

In step 218 of FIG. 9B, the value $D_X$ is added to the value $x_1$. In decision block 220, the system portion 30 determines if the sum of $D_X$ and $x_1$ is greater than the "X" coordinate, $x_{scan}$, of the center 86 of the pixel being analyzed. If the line segment crosses the horizontal axis 76 to the fight of the center 86 of the pixel 79, the result of decision block 220 is NO, and the logic state of the pixel being analyzed is unchanged. The system portion 30 returns to step 204 of FIG. 9A to analyze the next pixel in the horizontal scan row. If the line segment crosses the horizontal axis 76 to the left of the center 86 of the pixel being analyzed, the result of decision block 220 is YES, and the binary logic state of the pixel is changed in step 222. Note that the binary logic state goes either from off to on, or on to off, as described above. As previously discussed, once the binary logic state for a horizontal scan row has changed, it remains in the new binary logic state until the system portion 30 encounters another line segment that crosses the horizontal axis. The detailed analysis of the new line segment will determine whether the binary logic state of the pixels will change again. The system returns to step 204 in FIG. 9A to analyze the next line segment in the curve.

As discussed above, the indices $\Delta x_L$, $\Delta y_L$, and $\Delta s_y$ are used to determine an address in the look-up table 46. As is well known to those of ordinary skill in the art, a computer may store the data in a linear array occupying consecutive locations in the memory 17 (see FIG. 4B) of the computer 10. The calculation of a final address typically requires that the values of the indices be multiplied and added to produce a final address. As previously discussed, the Bézier curve is rendered from the bottom to the top which forces $\Delta y_L$ and $\Delta s_y$ to be positive numbers, but allows $\Delta x_L$ to be positive or negative depending on the slope of the line segments approximating the Bézier curve. Because the system portion 30 performs calculations with 1/64 pixel resolution, the index $\Delta y_L$ and the index $\Delta s_y$ have a possible range of 0 to 63, and the index $\Delta x_L$ has values ranging from +63 to −63. The final address may be calculated by weighting the different indices and adding the resultant weighted contributions of each index. For the indexes $\Delta x_L$, $\Delta y_L$, and $\Delta s_y$, the final address may be calculated by the following formula:

$$\text{Address} = \text{Base} + (256 * \Delta x_L) + (16 * \Delta y_L) + \Delta s_y \quad (1)$$

where Base is the base address of the data table stored in the memory 17 of the computer 10, and $\Delta x_L$, $\Delta y_L$, and $\Delta s_y$ are the values for the three index tables 38, 40, and 42, respectively. In effect, the index tables are the offset to the base address. Note that the indices could be weighted in other manners, such as the index $\Delta s_y$ being multiplied by 64 instead of the index $\Delta y_L$. The calculation of a final address given in the example above requires two separate multiplication calculations and two addition calculations.

As is well known, multiplication calculations are time consuming. To avoid multiplication calculations, the system portion 30 preweights the index tables 38, 40, and 42 (see FIG. 5) for the three indices, $\Delta x_L$, $\Delta y_L$, and $\Delta s_y$ to include the multiplication factor in the data values contained within the index tables 38, 40 and 42. Each of the index tables contains data values in which the multiplication calculation has already been performed. Thus, the data values contained in the index tables 38, 40, and 42 are pre-weighted to include the multiplication calculation. A short table look-up routine may be faster than a multiplication calculation indicated in the address formula set forth above in equation 1.

To illustrate the concept of preweighting, consider Table 1 below, which is a portion of index tables 38, 40, and 42 in FIG. 5. Table 1 contains data entries pre-weighted according to equation 1 above.

TABLE 1

| index pointer values | Preweighted Index Tables | | |
|---|---|---|---|
| | Index Table Values | | |
| | $\Delta x_L$ | $\Delta y_L$ | $\Delta s_y$ |
| 0 | 0 | 0 | 0 |
| 1 | 256 | 16 | 1 |
| 2 | 512 | 32 | 2 |
| 3 | 768 | 48 | 3 |
| 4 | 1024 | 64 | 4 |
| 5 | 1280 | 80 | 5 |
| 6 | 1536 | 96 | 6 |
| 7 | 1792 | 112 | 7 |
| 8 | 2048 | 128 | 8 |
| 9 | 2304 | 144 | 9 |
| 10 | 2560 | 160 | 10 |
| 11 | 2816 | 176 | 11 |
| 12 | 3072 | 192 | 12 |
| 13 | 3328 | 208 | 13 |
| 14 | 3584 | 224 | 14 |
| 15 | 3840 | 240 | 15 |

In the example shown in Table 1, if the values for the index pointers 37, 39, and 41 were 2, 3, and 4, for the indices $\Delta x_L$, $\Delta y_L$, and $\Delta s_y$, respectively, the result would be 256+192+4=452. This result is the data pointer 45 used to point to the location in the data look-up table 46 where the value of $D_X$ is stored. The use of preweighted look-up tables instead of multiplication calculations increases the speed of rendering a Bézier curve.

Using 1/64 pixel resolution and three indices would normally result in 528,384 (64 * 64 * 129) data values in the data look-up table 46. Using this resolution would result in a data look-up table that is much too large to be useful. Therefore, the present invention rounds off coordinate values to ⅛ pixel resolution. Reducing the number of possible coordinate values from 64 to 8 reduces the number of data values in the data look-up table 46. There are 9 possible data values for each of the index tables 40 and 42, ranging from 0 to 8. There are 17 possible data values for the index table 38, ranging from −8 to +8, including 0. Therefore, there are 1377 (9 * 9 * 17) data values for the data look-up table 46. This reduces the overall requirement for memory 17 (see FIG. 4B) in the computer 10.

Reduction from 1/64 pixel resolution to ⅛ pixel resolution may be accomplished by dividing the coordinate values by 8 and discarding any remainder. However, division is a time consuming calculation. Alternatively, the system portion 30 may perform the reduction from 1/64 pixel resolution to ⅛ pixel resolution by shifting the data value in 1/64 pixel resolution three bits to the right, resulting in ⅛ pixel resolution. In the presently preferred embodiment the index tables 38, 40, and 42 contain data values which include the reduction to ⅛ pixel resolution. That is, instead of allowing data values to range from 0 to 63 in the index tables 40 and 42, and from −63 to +63 in the index table 38, the system portion 30 uses data values ranging from 0 to 8, and −8 to +8, respectively.

Table 2, below, alters the data values of Table 1 to show data values for a reduction from 1/64 to ⅛ pixel resolution and pre-weighting to avoid multiplication calculations to determine a final address in the data look-up table 46.

TABLE 2

Preweighted Index Tables With Resolution Reduction

| index pointer values | Index Table Values | | |
|---|---|---|---|
| | $\Delta x_L$ | $\Delta y_L$ | $\Delta s_y$ |
| 0 | 0 | 0 | 0 |
| 1 | 0 | 0 | 0 |
| 2 | 0 | 0 | 0 |
| 3 | 0 | 0 | 0 |
| 4 | 256 | 16 | 1 |
| 5 | 256 | 16 | 1 |
| 6 | 256 | 16 | 1 |
| 7 | 256 | 16 | 1 |
| 8 | 256 | 16 | 1 |
| 9 | 256 | 16 | 1 |
| 10 | 256 | 16 | 1 |
| 11 | 256 | 16 | 1 |
| 12 | 512 | 32 | 2 |
| 13 | 512 | 32 | 2 |
| 14 | 512 | 32 | 2 |
| 15 | 512 | 32 | 2 |

In the example shown in Table 2, if the index pointer values were 2, 3, and 4, for the index pointers $\Delta x_L$, $\Delta y_L$, and $\Delta s_y$, respectively, the result would be $128 + 64 + 1 = 193$. This result is the data pointer 45 which is then used to point to the location in the data look-up table 46 where the value of $D_X$ is stored. Note that even though the reduction to ⅛ pixel resolution did not affect the size of the index tables 38, 40, and 42, the range of values within the index tables results in a significant decrease in the size of the data look-up table 46. Thus, the reduction in resolution results in a savings in the amount of memory 17 (see FIG. 4B) required by the present invention.

The data values shown in Table 2 are linearly arranged to provide the 1/64 to ⅛ pixel resolution reduction and multiplication weighting. However, a linear arrangement will result in large errors in the value of $D_X$ due to the round-off from 1/64 pixel resolution to ⅛ pixel resolution. This is particularly evident in the situation where a line segment has a small slope (i.e., large $\Delta x_L$ and a small $\Delta y_L$).

Figure 10A:
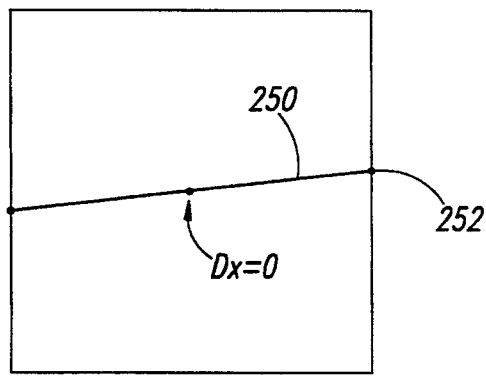
FIGS. 10A-10D illustrate round off errors introduced by the present invention.
Figure 10B:
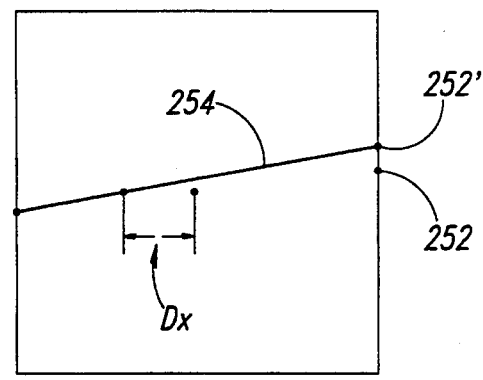
Figure 10C:
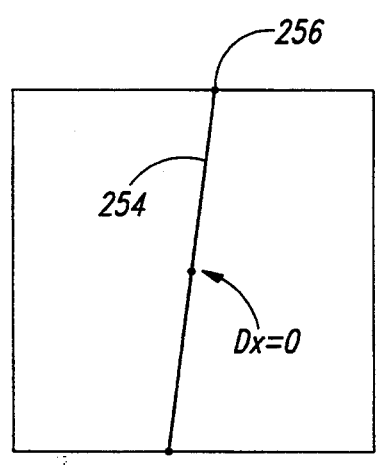
Figure 10D:
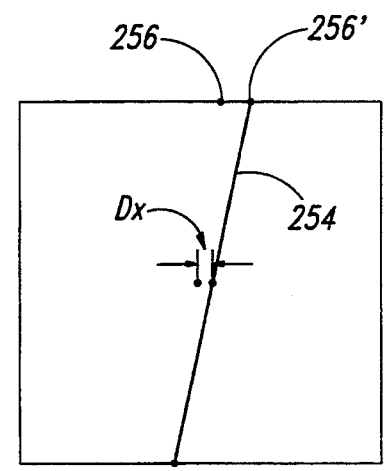

To illustrate the variability of error, consider a line segment 250 of FIG. 10A in which there is a large $\Delta x_L$ and a small $\Delta y_L$, with $D_X$ equal to zero. A slight change in the location of an end point 252 to 252', as shown in FIG. 10B, due to the rounding off, can result in a large change in $D_X$. In contrast, a line segment 254 shown in FIG. 10C has a small $\Delta x_L$ and a large $\Delta y_L$, with $D_X$ equal to zero. A slight change in the location of an end point 256 to location 256', shown in FIG. 10D, does not result in a significant change in $D_X$. In practice the round off errors are not as substantial as those shown in FIGS. 10B and 10D. The errors illustrated in FIGS. 10B and 10D are provided only to show the effect of the errors.

The system portion 30 compensates for the round-off errors by intentionally creating nonlinear data values in the index tables 38, 40, and 42 (see FIG. 5). The effect of nonlinear data values in the index tables 38, 40, and 42 is that there are more data values in the data look-up table 46 for areas of the pixel where the round-off errors have the greatest effect, and less data values in the data look-up table 46 for the areas of the pixel where the round off errors have the least effect. In the present embodiment, the data look-up table 46 does not have more data values overall, but rather it shifts the number of data values in a nonlinear fashion so as to reduce the overall error.

Table 3 below illustrates the manner in which Table 2 is altered to include nonlinear data values to compensate for the round-off errors resulting from the 1/64 to ⅛ pixel resolution.

TABLE 3

Nonlinear Preweighted Index Tables With Resolution Reduction

| index pointer values | Index Table Values | | |
|---|---|---|---|
| | $\Delta x_L$ | $\Delta y_L$ | $\Delta s_y$ |
| 0 | 0 | 0 | 0 |
| 1 | 0 | 0 | 0 |
| 2 | 0 | 0 | 1 |
| 3 | 256 | 0 | 1 |
| 4 | 256 | 0 | 1 |
| 5 | 256 | 0 | 1 |
| 6 | 256 | 16 | 2 |
| 7 | 256 | 16 | 2 |
| 8 | 256 | 16 | 2 |
| 9 | 256 | 16 | 2 |
| 10 | 512 | 16 | 2 |
| 11 | 512 | 16 | 2 |
| 12 | 512 | 32 | 3 |
| 13 | 512 | 32 | 3 |
| 14 | 512 | 32 | 3 |
| 15 | 512 | 32 | 3 |

Note that there are more data values allocated in Table 3 for large values of $\Delta x_L$, with correspondingly less data values allocated in the data look-up table 46 for small values of $\Delta x_L$. Similarly, there are more data values allocated for small values of $\Delta y_L$; and $\Delta s_y$, While Table 3 illustrates a simple example of resolution reduction and preweighting, the principles can easily be extended to any situation where round-off errors can be compensated through the use of nonlinear data tables. The same principles apply for any other reduction in display resolution or size of the data look-up table. For example, if there is only a 1/64 to 1/16 pixel reduction in resolution the data look-up table would contain more data values and less round off error than the 1/64 to ⅛ pixel resolution reduction used by the presently preferred embodiment. Therefore, the nonlinear index tables would not be the same as those illustrated in example shown of Table 3. It should be noted that the data values shown in Table 3 may vary from one application to another depending on such factors as the pixel size, the resolution of the calculations, the reduction in resolution and the size of the data look-up table 46.

The distance values in the data look-up table 46 are determined by using well known geometric measurement techniques to determine the distance $D_X$ for each possible line segment within a pixel. Each possible line segment will have a different $\Delta x_L$, $\Delta y_L$, and $\Delta s_y$. Once the distance $D_X$ for a particular line segment has been determined using geometric techniques, that distance value is compared to the distance value for the data look-up table 46 using the techniques of the present invention. The difference between the geometrically calculated distance and the distance calculated by the system portion 30 represents the error introduced by the round-off, as previously discussed. The data values in the data look-up table 46 and the nonlinear data values on the index tables 38, 40, and 42 are empirically determined using an iterative technique to reduce the root mean square error. That is, one can experimentally determine where transitions (i.e., breakpoints) should occur for the nonlinear data values in the index tables 38, 40, and 42 so that the overall error is minimized for all possible line segments within a pixel.

Figure 12:
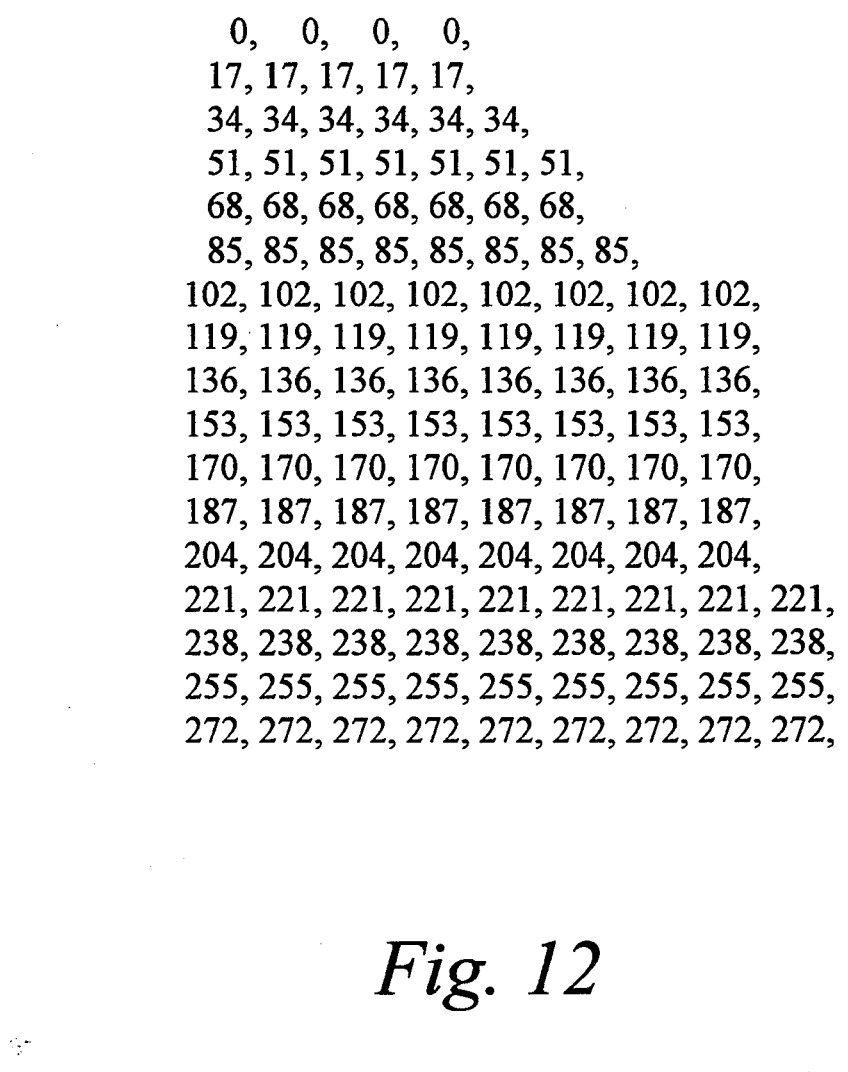
Figure 13:
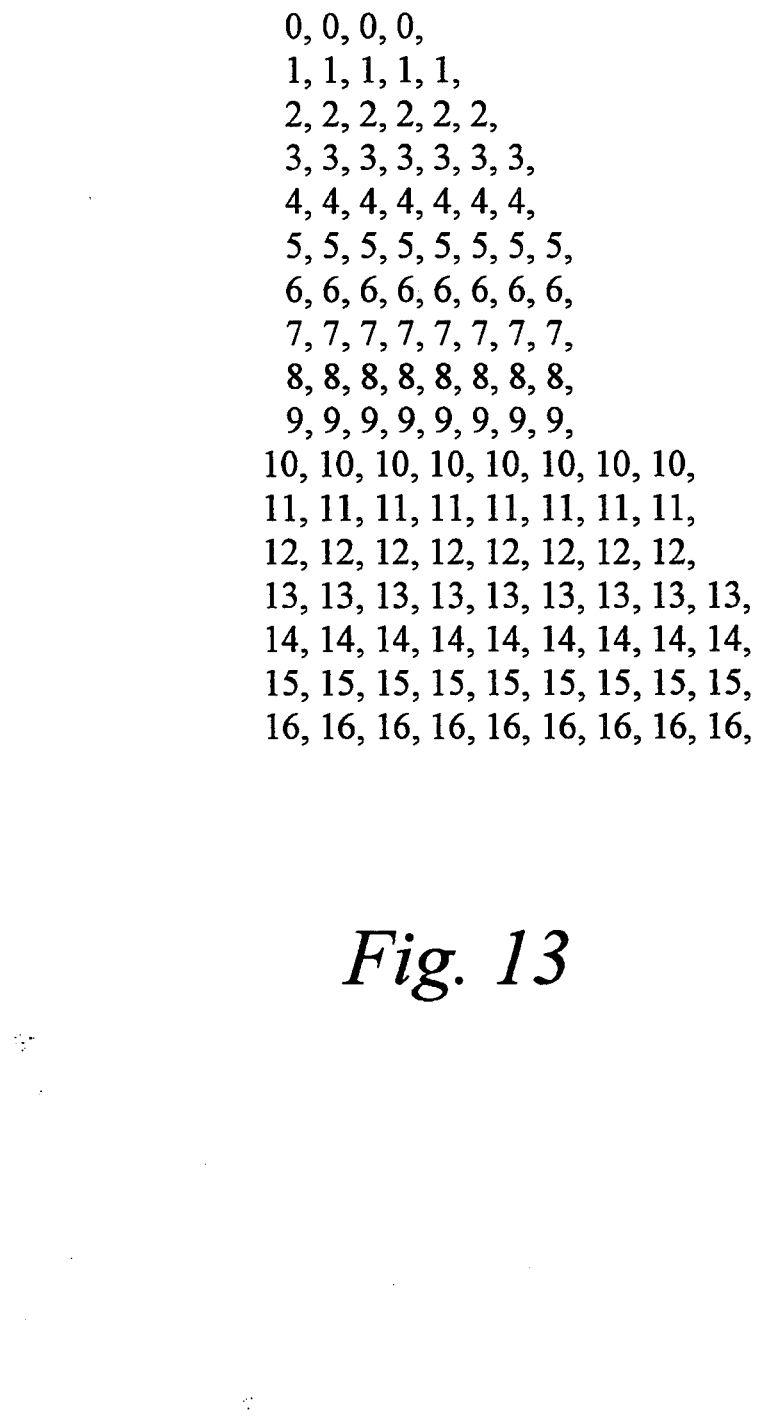

FIGS. 11–13 are the actual data values used for the index tables 38, 40, and 42, respectively. FIG. 13 lists the data values for $\Delta s_y$ (index table 42) ranging from 0 to 16, which corresponds to two pixel lengths with ⅛ pixel reduction. Similarly, FIG. 12 lists the data values for $\Delta y_L$ (index table 40) ranging from 0 to 16, but are multiplied times a scaling factor of 17 (corresponding to the total range for the index table 42). FIG. 11 lists the data values for $\Delta x_L$ (index table 38) which ranges from −16 to +16, but includes a multiplication factor of 289 (272+17) corresponding to the total range of the index table 40 and the index table 42. While the tables of FIGS. 11–13 are presented to illustrate the preferred embodiment of the present invention, it is apparent that the data values will vary if the selected resolution is different than 1/64 pixel resolution or the resolution reduction is other than ⅛ pixel resolution, or if a line segment length other than 2 pixels is selected.

Thus, the data look-up table 46 is maintained at a reasonable size without requiring any time consuming division calculations, and the three index tables 38, 40, and 42 are pre-weighted to avoid the need for any time consuming multiplication and division calculations. The data values contained in the three index tables 38, 40, and 42 are added together to produce the data pointer 45, which points to a location in the data look-up table 46. In the example shown in Table 3, if the data values for $\Delta x_L$, $\Delta y_L$, and $\Delta s_y$, are 2, 3, and 4, respectively, the data values in the nonlinear index table corresponding to $\Delta x_L$, $\Delta y_L$, and $\Delta s_y$, are 0, 64, and 1, respectively. The sum of these numbers, 65, is the data pointer 45, which provides the final address in the data look-up table 46.

In summary, the data contained within the data look-up table 46 indicates the value of $D_X$. The system portion 30 adds the value $D_X$ to the coordinate $x_1$. If the sum of $x_1 + D_X$ is less than or equal to $X_{scan}$, the value of the "X" coordinate of the center point of the pixel, the line segment crosses the horizontal axis to the left of the center point of the pixel. The decision to light the pixel or not is determined based on the point at which the line segment crosses the horizontal axis, as discussed above.

The system portion 30 of the present invention provides a convenient process for producing graphic images. The index tables 38, 40, and 42 avoid the need for time consuming multiplication and division calculations. The reduced size of the data look-up table 46 makes it feasible to implement the present invention on any computer. The nonlinear data entries minimize the round off error and allow graphic images to be produced with an acceptable overall error.

Note that while the foregoing discussion shows horizontal scan rows, the principles of the present invention are equally applicable to graphics display units that scan vertically or in any direction.

It is to be understood that even though various embodiments and advantages of the present invention have been set forth in the foregoing description and accompanying figures, the above disclosure is illustrative only, and changes may be made in detail, yet remain within the broad principles of the present invention. Therefore, the present invention is to be limited only by the appended claims.

What is claimed is:

1. A computer system for rendering an Nth order curve defined by N+1 control points for display on a graphic display unit using at least one first series of pixels arranged in a first dimension and a second series of pixels arranged in a second dimension to define a two dimensional array of pixels, the graphic display scanning the pixel array in the first dimension to display the curve, each pixel being defined by first and second opposite binary logic states, the computer system using a coordinate system in the first and second dimensions having a selected unit of measurement with a resolution greater than one pixel, the computer system comprising:

a line segment generator using the control points to subdivide the curve into a plurality of line segments with each line segment having a length no greater than one pixel and first and second end points, each of said end points having first and second coordinates indicating the location of said end points in the first and second dimensions, respectively, said coordinates being expressed in the selected units;

a pixel analyzer to determine if one of said line segments crosses a first center axis of the first pixel series, and if said one line segment does cross said first center axis, said pixel analyzer also generating first, second, and third index pointers corresponding to the distance from the first end point to the second end point of said one line segment in the first dimension, the distance from the first end point to the second end point of said one line segment in the second dimension, and the distance from the first end point of said one line segment to said first center axis in the second dimension, respectively, said pointers being expressed in the selected units;

a data look-up table containing a plurality of distance values expressed in the selected units and corresponding to the range of possible distances in the first dimension from a second center axis of the second pixel series in which said one line segment crosses said first center axis to the point at which said line segments cross said first center axis, said data look-up table having a final address pointer indicating a particular location in said data look-up table containing a distance value for said one line segment;

first, second and third index tables used to generate said final address pointer, each of said index tables containing a number of index table locations selected to correspond to the range of possible values of said first, second, and third index pointers, respectively, said first, second, and third index pointers indicating first, second, and third particular index table locations within said first, second, and third index tables, respectively;

address means for receiving said index data values from said first, second, and third particular locations and generating said final address pointer; and a rasterizer to add said distance value to said first coordinate of said first end point for said one line segment to determine the point at which said one line segment crosses said first center axis and, if said one line segment crosses said first center axis at a predetermined location relative to said second center axis, changing the binary logic state of the pixel in which said one line segment crosses said first center axis to the opposite binary logic state.

2. The system of claim 1 wherein said first, second, and third index table locations contain index data values that include a division factor to change from the selected unit of measurement to a second unit of measurement with a lower resolution.

3. The system of claim 2 wherein said first, second, and third index table locations contain index data values that are nonlinear data values selected to compensate for errors introduced from said resolution reduction.

4. The system of claim 1, wherein said index table locations containing index data values that are pre-weighted to include a multiplication factor, thereby avoiding multiplication operations in generating said final address pointer, said address means receiving said index data values from said first, second, and third particular locations and adding said index data values to generate said final address pointer.

5. A computer system for rendering an Nth order curve defined by N+1 control points for display on a graphic display unit using a plurality of first series of pixels arranged in a first dimension and a second series of pixels arranged in a second dimension to define a two dimensional array of pixels, the graphic display scanning the pixel array in the first dimension to display the curve, each pixel being defined by first and second opposite binary logic states, the computer system using a coordinate system in the first and second dimensions having a selected unit of measurement with a resolution greater than one pixel, the computer system comprising:

a line segment generator using the control points to subdivide the curve into a plurality of line segments with each line segment having a length no greater than two pixels and first and second end points, each of said end points having first and second coordinates indicating the location of said end points in the first and second dimensions, respectively, said coordinates being expressed in the selected units;

a pixel analyzer to determine if one of said line segments crosses a first center axis of the first pixel series, and if said one line segment does cross said first center axis, said pixel analyzer also generating first, second, and third index pointers corresponding to the distance from the first end point to the second end point of said one line segment in the first dimension, the distance from the first end point to the second end point of said one line segment in the second dimension, and the distance from the first end point of said one line segment to said first center axis in the second dimension, respectively, said pointers being expressed in the selected units, said pixel analyzer also determining if any of said plurality of line segments crosses said first center axis of an adjacent second one of the first pixel series, said pixel analyzer subdividing in half a line segment that crosses both said first center axis of said first one of the first pixel series and said first center axis of said adjacent second one of the first pixel series and treating said subdivided line segment in the same manner as said line segments;

a data look-up table containing a plurality of distance values expressed in the selected units and corresponding to the range of possible distances in the first dimension from a second center axis of the second pixel series in which said one line segment crosses said first center axis to the point at which said line segments cross said first center axis, said data look-up table having a final address pointer indicating a particular location in said data look-up table containing a distance value for said one line segment;

first, second and third index tables used to generate said final address pointer, each of said index tables containing a number of index table locations selected to correspond to the range of possible values of said first, second, and third index pointers, respectively, said first, second, and third index pointers indicating first, second, and third particular index table locations within said first, second, and third index tables, respectively;

address means for receiving said index data values from said first, second, and third particular locations and generating said final address pointer; and a rasterizer to add said distance value to said first coordinate of said first end point for said one line segment to determine the point at which said one line segment crosses said first center axis and, if said one line segment crosses said first center axis at a predetermined position relative to said second center axis, changing the binary logic state of the pixel in which said one line segment crosses said first center axis to the opposite binary logic state.

6. The system of claim 5 wherein said first, second, and third index table locations contain index data values that include a division factor to change from the selected unit of measurement to a second unit of measurement with a lower resolution.

7. The system of claim 6 wherein said first, second, and third index table locations contain index data values that are nonlinear data values selected to compensate for errors introduced from said resolution reduction.

8. The system of claim 7, wherein said index table locations containing index data values that are pre-weighted to include a multiplication factor, thereby avoiding multiplication operations in generating said final address pointer, said address means receiving said index data values from said first, second, and third particular locations and adding said index data values to generate said final address pointer.

9. A computer system for rendering an Nth order curve defined by N+1 control points for display on a graphic display unit using a plurality of first series of pixels arranged in a first dimension and a second series of pixels arranged in a second dimension to define a two dimensional array of pixels, the graphic display scanning the pixel array in :he first dimension to display the curve, each pixel being defined by first and second opposite binary logic states, the computer system using a coordinate system in the first and second dimensions having a selected unit of measurement with a resolution greater than one pixel, the computer system comprising:

a line segment generator using the control points to subdivide the curve into a plurality of line segments with each line segment having a length no greater than a predetermined number of pixels and first and second end points, each of said end points having first and second coordinates indicating the location of said end points in the first and second dimensions, said coordinates being expressed in the selected units:

a pixel analyzer to determine if one of said line segments crosses a first center axis of a first one of the first pixel series, and if said one line segment does cross said first center axis, said pixel analyzer also generating first, second, and third index pointers corresponding to the distance from the first end point to the second end point of said one line segment in the first dimension, the distance from the first end point to the second end point of said one line segment in the second dimension, and the distance from the first end point of said one line segment to said first center axis in the second dimension, said pointers being expressed in the selected units, said pixel analyzer also determining if any of said line segments crosses said first center axis of an adjacent second one of the first pixel series, said pixel analyzer subdividing said line segment that crosses both said first center axis of said first one of the first pixel series being analyzed and said first center axis of said adjacent second one of the first pixel series to generate subdivided line segments that do not cross said first center axis of more than one of the first pixel series, each of said subdivided line segments being treated in the same manner as said line segments and having first and second end points, each of said end points having first and second coordinates indicating the location of said end points in the first and second dimensions, said coordinates being expressed in the selected units;

a data look-up table containing a plurality of distance values expressed in the selected units and corresponding to the range of possible distances in the first dimension from a second center axis of one of the second pixel series in which said one line segment crosses said first center axis to the point at which said line segments cross said first center axis, said data look-up table having a final address pointer indicating a particular location in said data look-up table containing a distance value for said one line segment;

first, second and third index tables used to generate said final address pointer, each of said index tables containing a number of index table locations selected to correspond to the range of possible values of said first, second, and third index pointers, respectively, said first, second, and third index pointers indicating first, second, and third particular index table locations within said first, second, and third index tables, respectively;

address means for generating said final address pointer from said index data values from said first, second, and third particular locations; and a rasterizer to add said distance value for said one line segment to said coordinate of said first end point in the first dimension to determine the point at which said one line segment crosses said first center axis and, if said one line segment crosses said first center axis at a predetermined position relative to said second center axis, changing the binary logic state of the pixel in which said one line segment crosses said first center axis to the opposite binary logic state.

10. The system of claim 9 wherein said index table locations contain index data values that are pre-weighted to include a multiplication factor, thereby avoiding multiplication operations in generating said final address pointer, said address means receiving said index data values from said first, second, and third particular locations and adding said data index values to generate said final address pointer.

11. The system of claim 9 wherein said first, second, and third index table locations contain index data values that include a division factor to change from the selected unit of measurement to a second unit of measurement with a lower resolution.

12. The system of claim 11 wherein said first, second, and third index table locations contain index data values that are nonlinear data values selected to compensate for errors introduced from said resolution reduction.

13. A method using a computer system and a graphics display unit for rendering an Nth order curve defined by $N+1$ control points for display on the graphic display unit using at least one first series of pixels arranged in a first dimension and a second series of pixels arranged in a second dimension to define a two dimensional array of pixels, the graphic display scanning the pixel array in the first dimension to display the curve, each pixel being defined by first and second opposite binary logic states, the computer system using a coordinate system in the first and second dimensions having a selected unit of measurement with a resolution greater than one pixel, the method comprising the steps of:

(a) subdividing the curve into a plurality of line segments with each line segment having a length no greater than one pixel and first and second end points, each of said end points having first and second coordinates indicating the location of said end points in the first and second dimensions, respectively, said coordinates being expressed in the selected units;

(b) determining if one of said line segments crosses a first center axis of the first pixel series;

(c) if one of said line segments crosses said first center axis, generating first, second, and third index pointers for said one line segment, said first, second, and third index pointers corresponding to the distance from the first end point to the second end point of said one line segment in the first dimension, the distance from the first end point to the second end point of said one line segment in the second dimension and the distance from the first end point of said one line segment to said first center axis in the second dimension, respectively, said pointers being expressed in the selected units;

(d) determining first, second, and third particular index table locations within a first, second, and third index tables using said first, second, and third index pointers. respectively, each of said index tables containing a number of index table locations selected to correspond to the range of possible values of said first, second, and third index pointers, respectively, (e) generating a final address pointer using the index data values in said first, second, and third particular index table locations;

(f) determining a particular location in a data look-up table containing a distance value for said one line segment using said final address pointer, said data look-up table containing a plurality of distance values expressed in the selected units and corresponding to the range of possible distances in the first dimension from a second center axis of the second pixel series in which said one line segment crosses said first center axis to the point at which said line segments cross said first center axis;

(g) adding said distance value to said first coordinate of said first end point for said one line segment to determine the point at which said one line segment crosses said first center axis; and (h) changing the binary logic state of the pixel in which said one line segment crosses said first center axis to the opposite binary logic state said one line segment crosses said first center axis at a predetermined location relative to said second center axis.

14. The method of claim 13 wherein step (a) of subdividing the curve into said plurality of straight line segments includes the steps of:

(1) measuring the absolute magnitude of the difference in pixels from each of the $N+1$ control points to an adjacent control point for the first dimension to give N difference values for the first dimension;

(2) measuring the absolute magnitude of the difference in pixels from each of the N+1 control points to an adjacent control point for the second dimension to give N difference values for the second dimension;

(3) determining the maximum value for said N difference values for the first and said second dimensions; and (4) doubling said maximum value to determine a minimum number of line segments into which the curve is subdivided.

15. The method of claim 13, further including the step of changing the binary logic state of all subsequent pixels in the first pixel series if step (h) changed the binary logic state of the pixel in which said one line segment crosses said first center axis until step (h) changes to an opposite binary logic state the binary logic state of another pixel in which one of said line segments crosses said first center axis.

16. The method of claim 13 wherein said index table locations contain index data values that are pre-weighted to include a multiplication factor, step (e) of generating said final address pointer adding the index data values in said first, second and third particular index table locations, thereby avoiding multiplication operations in generating said final address pointer.

17. The method of claim 13 wherein said first, second, and third index table locations contain index data values that include a division factor to change from the selected unit of measurement to a second unit of measurement with a lower resolution, said step (e) using said index data values with reduced resolution to generate said final address pointer.

18. The method of claim 17, wherein said index table locations contain nonlinear data values to compensate for errors caused by said division factor, said step (e) using said nonlinear index data values with reduced resolution to generate said final address pointer.

19. A method using a computer system and a graphics display unit for rendering an Nth order curve defined by N+1 control points for display on the graphic display unit using a plurality of a first series of pixels arranged in a first dimension and a second series of pixels arranged in a second dimension to define a two dimensional array of pixels, the graphic display scanning the pixel array in the first dimension to display the curve, each pixel being defined by first and second opposite binary logic states, the computer system using a coordinate system in the first and second dimensions having a selected unit of measurement with a resolution greater than one pixel, the method comprising the steps of:

(a) subdividing the curve into a plurality of line segments with each line segment having a length no greater than two pixels and first and second end points, each of said end points having first and second coordinates indicating the location of said end points in the first and second dimensions, respectively, said coordinates being expressed in the selected units;

(b) determining if one of said line segments crosses a first center axis of a first one of the first pixel series;

(c) determining if any of said line segments crosses said first center axis of an adjacent second one of the first pixel series;

(d) subdividing said line segment that crosses both said first center axis of said first one of the first pixel series and said first center axis of said adjacent second one of the first pixel series until each of said subdivided line segments crosses only one of said first center axis and treating each of said subdivided line segments in the same manner as said line segments, each of said subdivided line segments having first and second end points, each of said end points having first and second coordinates indicating the location of said end points in the first and second dimensions, said coordinates being expressed in the selected units;

(e) if one of said line segment does cross said first center axis, generating first, second, and third index pointers for said one line segment, said first, second, and third index pointers corresponding to the distance from the first end point to the second end point of said one line segment in the first dimension, the distance from the first end point to the second end point of said one line segment in the second dimension, and the distance from the first end point of said one line segment to said first center axis in the second dimension, respectively, said pointers being expressed in the selected units;

(f) determining first, second, and third particular index table locations within a first, second, and third index tables using said first, second, and third index pointers, respectively, each of said index tables containing a number of index table locations selected to correspond to the range of possible values of said first, second, and third index pointers, respectively;

(g) generating a final address pointer using the index data values in said first, second, and third particular index table locations;

(h) determining a particular location in a data look-up table containing a distance value for said one line segment using said final address pointer, said data look-up table containing a plurality of distance values expressed in the selected units and corresponding to the range of possible distances in the first dimension from a second center axis of the second pixel series in which said one line segment crosses said first center axis to the point at which said line segments cross said first center axis;

(i) adding said distance value to said first coordinate of said first end point for said one line segment to determine the point at which said one line segment crosses said first center axis; and (j) changing the binary logic state of the pixel in which said one line segment crosses said first center axis to the opposite binary logic state if said one line segment crosses said first center axis at a predetermined location relative to said second carrier axis.

20. The method of claim 19 wherein step (a) of subdividing the curve into said plurality of straight line segments includes the steps of:

(1) measuring the absolute magnitude of the difference in pixels from each of the N+1 control points to an adjacent control point for the first dimension to give N difference values for the first dimension;

(2) measuring the absolute magnitude of the difference in pixels from each of the N+1 control points to an adjacent control point for the second dimension to give N difference values for the second dimension;

(3) determining the maximum value for said N difference values for the first and said second dimensions; and (4) subdividing the curve into said plurality of line segments using said maximum value to determine the minimum number of line segments.

21. The method of claim 19, further including the step of changing the binary logic state of all subsequent pixels in the first pixel series if step (j) changed the binary logic state of the pixel in which said one line segment crosses said first center axis until step (j) changes to an opposite binary logic state the binary logic state of another pixel in which one of said line segments crosses said first center axis.

22. The method of claim 19 wherein said index table locations contain index data values that are pre-weighted to include a multiplication factor, step (e) of generating said final address pointer adding the index data values in said first, second and third particular index table locations, thereby avoiding multiplication operations in generating said final address pointer.

23. The method of claim 19 wherein said first, second, and third index table locations contain index data values that include a division factor to change from the selected unit of measurement to a second unit of measurement with a lower resolution said step (e) using said index data values with reduced resolution to generate said final address pointer.

24. The method of claim 23 wherein said index table locations contain nonlinear data values to compensate for errors caused by said division factor, said step (e) using said nonlinear index data values with reduced resolution to generate said final address pointer.

25. A method using a computer system and a graphics display unit for rendering an Nth order curve defined by N+1 control points for display on the graphic display unit using a plurality of a first series of pixels arranged in a first dimension and a second series of pixels arranged in a second dimension to define a two dimensional array of pixels, the graphic display scanning the pixel array in the first dimension to display the curve, each pixel being defined by first and second opposite binary logic states, the computer system using a coordinate system in the first and second dimensions having a selected unit of measurement with a resolution greater than one pixel, the method comprising the steps of:

(a) subdividing the curve into a plurality of line segments with each line segment having a length no greater than a predetermined number of pixels and first and second end points, each of said end points having first and second coordinates indicating the location of said end points in the first and second dimensions, respectively, said coordinates being expressed in the selected units;

(b) determining if one of said line segments crosses a first center axis of a first one of the first pixel series;

(c) determining if any of said line segments crosses said first center axis of an adjacent second one of the first pixel series;

(d) subdividing said line segment that crosses both said first center axis of said first one of the first pixel series and said first center axis of said adjacent second one of the first pixel series until each of said subdivided line segments crosses only one of said first center axis and treating each of said subdivided line segments in the same manner as said line segments, each of said subdivided line segments having first and second end points, each of said end points having first and second coordinates indicating the location of said end points in the first and second dimensions, said coordinates being expressed in the selected units;

(e) if one of said line segments does cross said first center axis, generating first, second, and third index pointers for said one line segment, said first, second, and third index pointers corresponding to the distance from the first end point to the second end point of said one line segment in the first dimension, the distance from the first end point to the second end point of said one line segment in the second dimension, and the distance from the first end point of said one line segment to said first center axis in the second dimension, respectively, said pointers being expressed in the selected units;

(f) determining first, second, and third particular index table locations within a first, second, and third index tables using said first, second, and third index pointers, respectively, each of said index tables containing a number of index table locations selected to correspond to the range of possible values of said first, second, and third index pointers, respectively;

(g) generating a final address pointer using the index data values in said first, second, and third particular index table locations;

(h) determining a particular location in a data look-up table containing a distance value for said one line segment using said final address pointer, said data look-up table containing a plurality of distance values expressed in the selected units and corresponding to the range of possible distances in the first dimension from a second center axis of the second pixel series in which said one line segment crosses said first center axis to the point at which said line segments cross said first center axis;

(i) adding said distance value to said first coordinate of said first end point for said one line segment to determine the point at which said one line segment crosses said first center axis; and (j) changing the binary logic state of the pixel in which said one line segment crosses said first center axis to the opposite binary logic state if said one line segment crosses said first center axis at a predetermined location relative to said second center axis.

26. The method of claim 25 wherein step (a) of subdividing the curve into said plurality of straight line segments includes the steps of:

(1) measuring the absolute magnitude of the difference in pixels from each of the N+1 control points to an adjacent control point for the first dimension to give N difference values for the first dimension;

(2) measuring the absolute magnitude of the difference in pixels from each of the N+1 control points to an adjacent control point for the second dimension to give N difference values for the second dimension;

(3) determining the maximum value for said N difference values for the first and said second dimensions; and (4) subdividing the curve into said plurality of line segments using said maximum value to determine the minimum number of line segments.

27. The method of claim 25, further including the step of changing the binary logic state of all subsequent pixels in the first pixel series if step (j) changed the binary logic state of the pixel in which said one line segment crosses said first center axis until step (j) changes to an opposite binary logic state the binary logic state of another pixel in which one of said line segments crosses said first center axis.

28. The method of claim 25 wherein said index table locations contain index data values that are pre-weighted to include a multiplication factor, step (e) of generating said final address pointer adding the index data values in said first, second and third particular index table locations, thereby avoiding multiplication operations in generating said final address pointer.

29. The method of claim 25 wherein said first, second, and third index table locations contain index data values that include a division factor to change from the selected unit of measurement to a second unit of measurement with a lower resolution, said step (e) using said index data values with reduced resolution to generate said final address pointer.

30. The method of claim 29 wherein said index table locations contain nonlinear data values to compensate for errors caused by said division factor, said step (e) using said nonlinear index data values with reduced resolution to generate said final address pointer.

* * * * *